(12) United States Patent
Wyatt et al.

(10) Patent No.: US 11,788,995 B2
(45) Date of Patent: Oct. 17, 2023

(54) SYSTEM AND METHOD FOR BACKGROUND REMOVAL IN SPECTROMETRY SYSTEM

(71) Applicant: MLS ACQ, INC., East Windsor, CT (US)

(72) Inventors: Eddie Dean Wyatt, Havertown, PA (US); Peter Paul Behnke, Vernon, CT (US); Martin L. Spartz, Ellington, CT (US)

(73) Assignee: MLS ACQ, INC., East Windsor, CT (US)

( * ) Notice: Subject to any disclaimer, the term of this patent is extended or adjusted under 35 U.S.C. 154(b) by 510 days.

(21) Appl. No.: 15/674,143

(22) Filed: Aug. 10, 2017

(65) Prior Publication Data
US 2018/0045694 A1    Feb. 15, 2018

Related U.S. Application Data

(60) Provisional application No. 62/372,944, filed on Aug. 10, 2016.

(51) Int. Cl.
| | |
|---|---|
| *G01N 30/74* | (2006.01) |
| *G01N 30/86* | (2006.01) |
| *B01D 53/02* | (2006.01) |
| *B01D 53/30* | (2006.01) |
| *G01N 21/31* | (2006.01) |

(Continued)

(52) U.S. Cl.
CPC .......... *G01N 30/74* (2013.01); *B01D 53/025* (2013.01); *B01D 53/30* (2013.01); *G01N 21/31* (2013.01); *G01N 30/8624* (2013.01); *G01N 30/8631* (2013.01); *G01N 30/8668* (2013.01); *G01N 30/8686* (2013.01); *G01N 30/72* (2013.01); *G01N 2021/3196* (2013.01); *G01N 2030/025* (2013.01); *G01N 2030/743* (2013.01)

(58) Field of Classification Search
None
See application file for complete search history.

(56) References Cited

U.S. PATENT DOCUMENTS

| | | |
|---|---|---|
| 5,436,166 A | 7/1995 | Ito et al. |
| 9,606,088 B2 | 3/2017 | Spartz et al. |

(Continued)

FOREIGN PATENT DOCUMENTS

| | | |
|---|---|---|
| EP | 0 437 829 A1 | 7/1991 |
| EP | 0 486 030 A2 | 5/1992 |
| EP | 2 717 049 A1 | 4/2014 |

OTHER PUBLICATIONS

International Preliminary Report on Patentability, dated Feb. 21, 2019, from International Application No. PCT/US2017/046315, filed on Aug. 10, 2017. Ten pages.

(Continued)

*Primary Examiner* — Xiaoyun R Xu
(74) *Attorney, Agent, or Firm* — Michael Best & Friedrich LLP

(57) ABSTRACT

An analysis system includes a separation system that provides compounds to a sample cell of a spectrometric system. The system analyzes spectral information from the spectrometric system by optimizing retention windows for the compounds and identifies quantities of the compounds by comparing spectral information within and outside the respective retention windows.

11 Claims, 19 Drawing Sheets

(51) Int. Cl.
   *G01N 30/72*     (2006.01)
   *G01N 30/02*     (2006.01)

(56) References Cited

U.S. PATENT DOCUMENTS

2015/0260695 A1    9/2015  Spartz et al.
2019/0041369 A1*   2/2019  Aisu ................. G01N 30/7233

OTHER PUBLICATIONS

Dromey, R.G. et al., "Extraction of Mass Spectra Free of Background and Neighboring Component Contributions from Gas Chromatography/Mass Spectrometry Data," Analytical Chemistry, vol. 48, No. 9, Aug. 1976. Eight pages.

International Search Report and the Written Opinion of the International Searching Authority, dated Oct. 10, 2017, from International Application No. PCT/US2017/046315, filed on Aug. 10, 2017. Seventeen pages.

\* cited by examiner

SYSTEM AND METHOD FOR BACKGROUND REMOVAL IN SPECTROMETRY SYSTEM

RELATED APPLICATIONS

This application claims the benefit under 35 USC 119(e) of U.S. Provisional Application No. 62/372,944, filed on Aug. 10, 2016, which is incorporated herein by reference in its entirety.

BACKGROUND OF THE INVENTION

Spectrometry-based gas analyzers, such as Fourier transform infrared spectrometry (FTIR) gas analyzers, are becoming common for environmental compliance applications and process gas monitoring, in addition to other gas analysis applications. They are generally good for measuring compounds from 0.1 parts per million (ppm) to a few percent levels in an environmental exhaust, for example. On the other hand, spectrometry-based gas analyzers generally perform poorly when parts per billion (ppb) detection levels are required. Moreover, if too many compounds are present simultaneously (e.g., greater than 10-20) or too many unknowns are present, the analysis of the spectral data becomes too difficult and the results become somewhat questionable.

Gas chromatography (GC) is an analytical method that measures the content of various compounds in a sample. The method for separating chemical substances relies on differences in partitioning behavior between a flowing mobile phase (gas phase) and a stationary phase supported in a column to separate the compounds in a mixture. As the gas flow passes through the column, the compounds of the sample move at velocities that are influenced by the degree of interaction of each compound with the stationary phase in the column. Consequently, the different compounds separate as the compounds elute from the column.

Gas chromatography can be utilized for many compounds but also has many drawbacks, which include a need for full peak separation to qualify and quantify compounds present, small sample sizes and dynamic ranges, and continuing calibration.

Combined GC-FTIR systems are also known in the industry. In fact, such systems have been available for decades. They have not been widely accepted, however, because other GC detectors are more sensitive.

More recently however, a new class of GC-FTIR analysis systems have been proposed. They are characterized by spectrometric sample cells that partially or fully integrate the components/compounds flowing from the GC over time. They use signal analysis techniques to remove the spectral contribution of earlier compound peaks and water flowing from the GC to identify the currently eluting compounds. Such systems are disclosed, for example, in U.S. Pat. No. 9,606,088 by Spartz, et al., which application is incorporated herein by this reference in its entirety.

SUMMARY OF THE INVENTION

The present invention concerns identifying the eluting compounds even when multiple compounds are eluting at the same time and optimizing the retention windows for those compounds.

In general, according to one aspect, the invention features a method for analyzing sample spectra of a sample from a spectrometric system. The method comprises shifting retention windows and/or shifting lower bounds of the retention windows and/or shifting upper bounds of the retention windows, comparing the sample spectra from the shifted retention windows to reference spectra for compounds of interest in the sample, and updating the retentions windows used to analyze the sample.

In some embodiments, shifting the retention windows includes shifting the entire retention windows. The reference spectra are regressed over the sample spectra from the shifted retention windows and the fit is rated.

In some embodiments, shifting the retention windows further or alternatively includes separately shifting the lower bounds of the retention windows and shifting the upper bounds of the retention windows. Here also, reference spectra are regressed over the sample spectra from the shifted retention windows and the fit is rated.

The shifted retention windows can be validated, such as by calculating retention times for compounds based on the shifted retention windows, comparing the calculated retention times against expected retention times for the compounds, and analyzing differences between the calculated retention times against expected retention times for different compounds to validate the shifted retention windows and/or highlight outlier calculated retention windows.

In general, according to another aspect, the invention features a method for analyzing spectral information from a spectrometric system. The method comprises defining multiple, separate quant regions in reference spectra for a compound of interest and analyzing a gas sample by comparing spectra from the gas sample to the multiple quant regions in the reference spectra.

Preferably, correction vectors are provided for the quant regions. They can correct for baseline drift. Further, different correction vectors can be provided for each of the quant regions.

In one example, a graphical user interface showing a spectrum is displayed. The user is allowed to graphically define the multiple quant regions on the displayed spectrum.

In general according to another aspect, the invention features an analysis system. It comprises a separator for separating a sample into its compounds. Retention windows characterize when the compounds elute from the separator. A spectrometric system gathers sample spectra of the compounds eluting from the separator. Finally, a computer system, such as a controller, identifies the compounds by shifting the retention windows and/or shifting lower bounds of the retention windows and/or shifting upper bounds of the retention windows, by comparing the spectra from the shifted retention windows to reference spectra for the compounds, and by updating the retention windows.

In general according to another aspect, the invention features an analysis system. It comprises a separator for separating a sample into its compounds, a spectrometric system for gathering sample spectra of the compounds eluting from the separator and a computer system, such as a controller, that identifies the compounds from the sample spectra by enabling definition of multiple, separate quant regions in reference spectra for the compounds and analyzing the compounds by comparing sample spectra to the multiple regions in the reference spectra.

In general according to another aspect, the invention features a method for analyzing spectral information from a spectrometric system. The method comprises comparing sample spectra of a sample from retention windows for compounds of interest to reference spectra for the compounds of interest and background spectra of the sample and determining amounts of the compounds of interest in the sample.

In general according to another aspect, the invention features an analysis system. The system comprises a separator for separating a sample into its compounds, a spectrometric system for gathering spectra of the compounds eluting from the separator, and a computer system, such as a controller, that compares sample spectra of the sample from retention windows for compounds of interest to reference spectra for the compounds of interest and background spectra of the sample and determines amounts of the compounds of interest in the sample.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

As used herein, the singular forms and the articles "a", "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
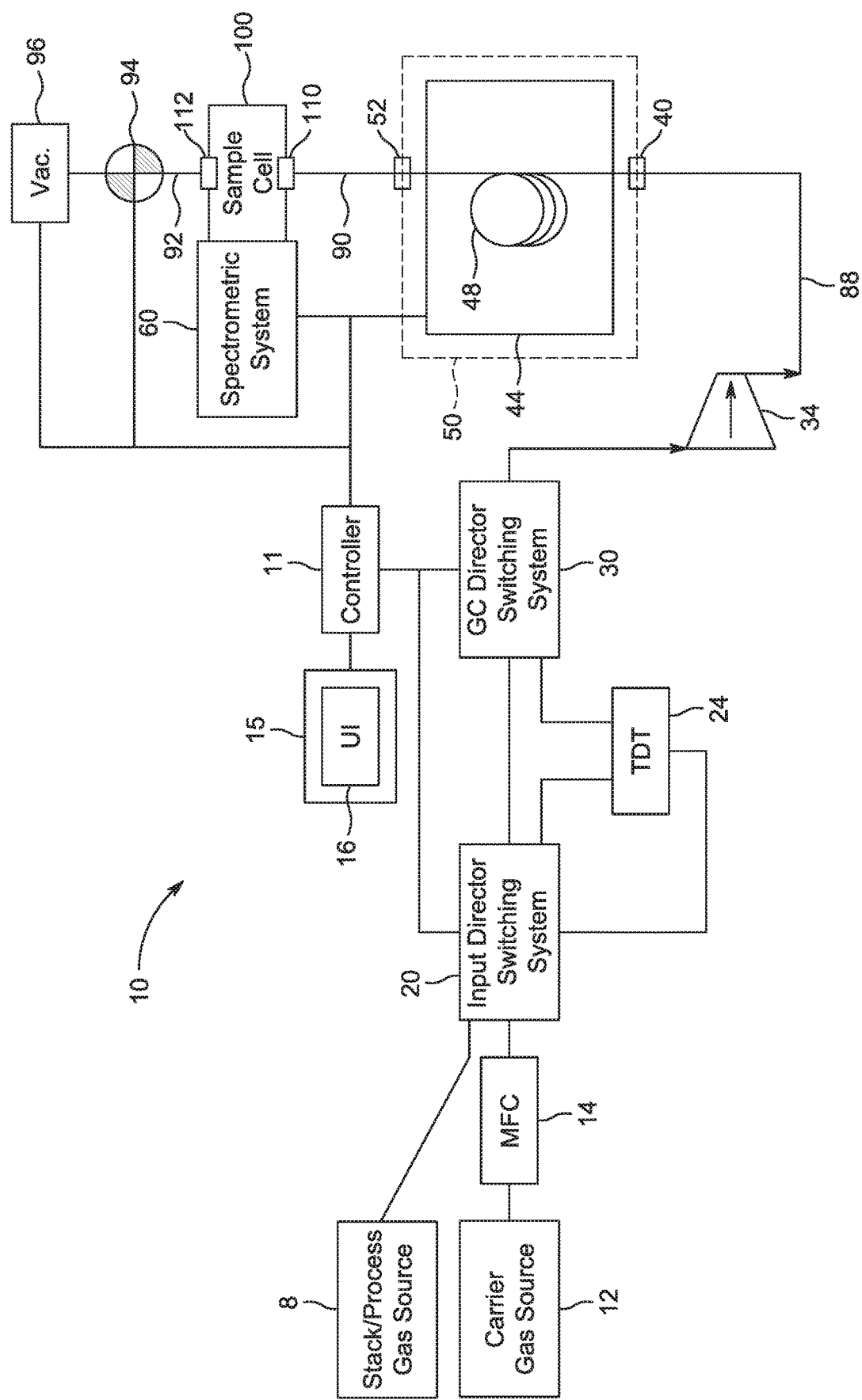
FIG. 1 is a schematic diagram of an exemplary analysis system, to which the principles of the present invention can be applied.

An exemplary analysis system 10, to which the principles of the present invention can be applied, is shown in schematic form in FIG. 1.

Generally, the system 10 includes a separator 50 for separating a sample, such as a gas sample, into its components (e.g., separate compounds), a spectrometric system 60 for gathering the spectra of those compounds in a sample cell 100, and a controller 11 that controls the system and uses the spectra to identify the compounds of the sample and their amounts, such as concentrations.

In different implementations, the spectrometric system 60 determines the spectral response, i.e., sample spectra, of the compounds in the sample cell 100 in one or more of the following spectral regions: near-, mid- and/or far-infrared, visible, and/or ultraviolet (UV) (including vacuum ultraviolet (VUV)). Further, the spectrometric system can measure different characteristics, such as absorption spectra, emission (including blackbody or fluorescence) spectra, elastic scattering and reflection spectra, and/or inelastic scattering (e.g., Raman and Compton scattering) spectra of the compounds in the sample cell.

In the case of optical spectrometric systems, for example, different technologies can be employed. In Fourier transform infrared spectrometry (FTIR) systems, single beam spectra are generated by taking the raw interferograms from the FTIR spectrometer and then converting those interferograms to intensity versus wavenumber spectra. In other situations, spectra might be directly read-out as in the case where the spectrometric system 60 is a post dispersive system, which includes a broadband source and a spectrally resolving detector system. In other examples, the spectrometric system 60 includes a tunable optical source (e.g., tunable laser) and a detector. Here, the spectral information is a function of the time response of the detector, in such a pre-dispersive system.

In general, the spectrometry system 60 is preferably sufficiently sensitive so that by analysis of the sample spectra, the controller 11 is able to detect at least some of the sample compounds with low concentration, such as in a few percent to low parts per million concentrations, or lower to parts per billion.

In the current embodiment, the spectrometric system 60 is a FTIR system. Its sample cell 100 has an inlet port 110 for receiving a separator line 90. The sample cell 100 of the spectrometric system 60 has an outlet port 112 for venting the sample cell contents through exit line 92. An exit valve 94 seals and controls the flow from the sample cell 100. A vacuum pump 96 is further provided after the exit valve 94 so that a vacuum or partial vacuum can be drawn on the sample cell 100.

The compounds of the sample are separated in time by the separation system 50, which is preferably a gas chromatography system. The GC system has a gas chromatographic column 48. Often the column 48 is coiled in order to minimize the size while maintaining sufficient tube or column length. Column 48 has a proximate end or inlet 40 for receiving sample from sample inlet line 88 and distal end or outlet 52 for directing resulting product through line 90 to the sample cell 100 for the spectrometry system 60.

The column 48 is typically contained within a temperature controlled chamber 44 with a heat source (oven), such as a heating coil that is thermostatically controlled by the controller 11 in order to maintain a selected constant temperature during a gas chromatography analysis run. The heat source should also provide sufficient heat to the chamber interior so that a temperature is sufficiently high to ensure that the sample reaches a gaseous state. In a current implementation, the column 48 is resistively heated. This avoids the need for the oven. Specifically, the column 48 is heated directly by passing a current through the metal column and monitoring the resistance to know the temperature.

Nevertheless, often compounds are not sufficiently concentrated to be adequately identified and measured. As a result, in the same analysis system 10, a sample can be first concentrated prior to separation. In these circumstances, the samples are passed through a concentrator 24, then separated in the separation system 50 and then analyzed by the spectrometric system 60. Examples of concentrators suitable for such purpose are thermal desorption tubes (TDT) or cold (cryo) traps. Further, if the samples have trace concentrations, for example in the parts per billion or parts per trillion, a series of concentrators can be used in the analysis system 10. Such configurations allow the same system to be used for a wide variety of samples and sampling conditions.

In one mode of operation, the sample flows through the gas cell 100 and out through the exit valve 94 and multiple spectra are obtained over time by the spectrometry system 60 and possibly averaged for detection limit reduction, i.e., enhancing detection sensitivity.

In another mode of operation, the vacuum pump 96 draws a vacuum on the gas cell 100 and then the exit valve 94 is shut. In this mode, the cell 100 integrates and collects compounds of a sample for a certain time period. Here, the sample cell 100 has been partially or fully evacuated at the beginning of the run. Then, fluid compounds, e.g., gas(es), are allowed to accumulate in the sample cell 100, integrating their spectral signatures. Multiple sample spectra obtained over a time interval can then be averaged to best measure the integrated concentration in the sample cell. Then, the final spectra are then used as a background or interferent spectra and new spectra are obtained as new compounds flow into the sample cell 100. The spectra of the new compounds are obtained by comparing the current spectra to the background spectra. Then this process is repeated. Such a system is generally described in U.S. Pat. No. 9,606,088 to Spartz, et al., the teaching of which are incorporated herein by this reference.

To facilitate sensitivity, the sample cell 100 is a single pass or a multiple pass cell such as a White cell or modified White cell with aspherical optics, in some embodiments.

In other examples, the cell 100 is a partially integrating cell or a flow cell, such as a lightpipe, through which the output from the separation system 50 flows.

System 10 further includes an input director switching system 20 and a GC director switching system 30 for controlling the flow of gases into and out of the TDT 24 and the GC 50.

The input director switching system 20 is connected for receiving sample gas from source 10 such as process gas or gas from a stack. It also connects to a carrier gas source 12, such as nitrogen, helium or other essentially inert gas that will not interfere with detecting pollutants and other impurities. A mass flow controller (MFC) 14 is preferably provided inline between the carrier gas source 12 and the input director 20 to control the flow rate of the carrier gas. The input director switching system 20 then selectively connects either of these two sources directly to the GC director switching system 30 or to the TDT 24.

The GC director switching system 30 is connected for receiving sample or carrier gas from the input director switching system 20 or gas desorbing from the TDT 24. The output director switching system 30 then provides gas to the GC 50. Possibly a compressor 34 is provided inline between the GC director switching system 30 and the GC 50.

By control of the input director switching system 20 and the GC director switching system 30, a gas sample can be concentrated in the TDT and the desorbed into the GC 50 or the TDT 24 can be bypassed and the gas sample provided directly to the GC 50.

In practice, the functions of the controller 11 are often distributed among multiple computer systems. For example, one computer system will often perform the functions of real-time control of the system 10 and collecting and logging the data from the system 10. This includes controlling the flow of gases and liquids throughout the system 10 by controlling one or more MFCs, e.g., 14, input director 20, GC director 30, collection and desorption of TDT 24, valves, e.g., 94, compressor 34, vacuum pump 96, and separator 50 in addition to the other compounds of the system 10. The real-time control functions further include collecting and recording the spectral information (sample spectra) from the spectrometric system 60. Then, a second computer system will often be utilized to analyze that data and identify the specific compounds of the sample. This includes analyzing the spectral information and how that information changes over time and recording and reporting the components/compounds present with their amounts, such as concentrations or mass, to an operator via a user interface or to another computer. These data are compared with known preset amounts or concentrations (e.g., determined in a calibration procedure) that the spectrometry system 60 is capable of detecting.

Also shown is a display device 15. The display device presents a user interface 16 allows the user to interact with the controller 11, or other computer system, and thereby control the operation of the analysis system 10. Further, the user interface 16 displays information from the controller 11 concerning the analysis of the sample.

Background Removal

Gas samples to be tested, such as gas from stacks, can contain high concentrations of water. And water absorbs IR across a wide spectral range. These absorption bands for water should generally be avoided in quant regions if possible. Quant regions are the spectral bands that are used to characterize or quantify the concentration of a particular compound in the sample.

When selecting quant regions for components or compounds, e.g., gases, not only should the water regions be avoided, in most cases the selected quant regions should avoid features in the CH stretching region (2700 to 3200 wavenumbers). The reason for avoiding the CH region is that other compounds with CH bonds in the sample may elute at the same time as the compound being quantified or analyzed and will also share spectral features there. So for some compounds being quantified, it becomes impossible to find distinguishing features that are clear of all these interferences.

Figure 4:
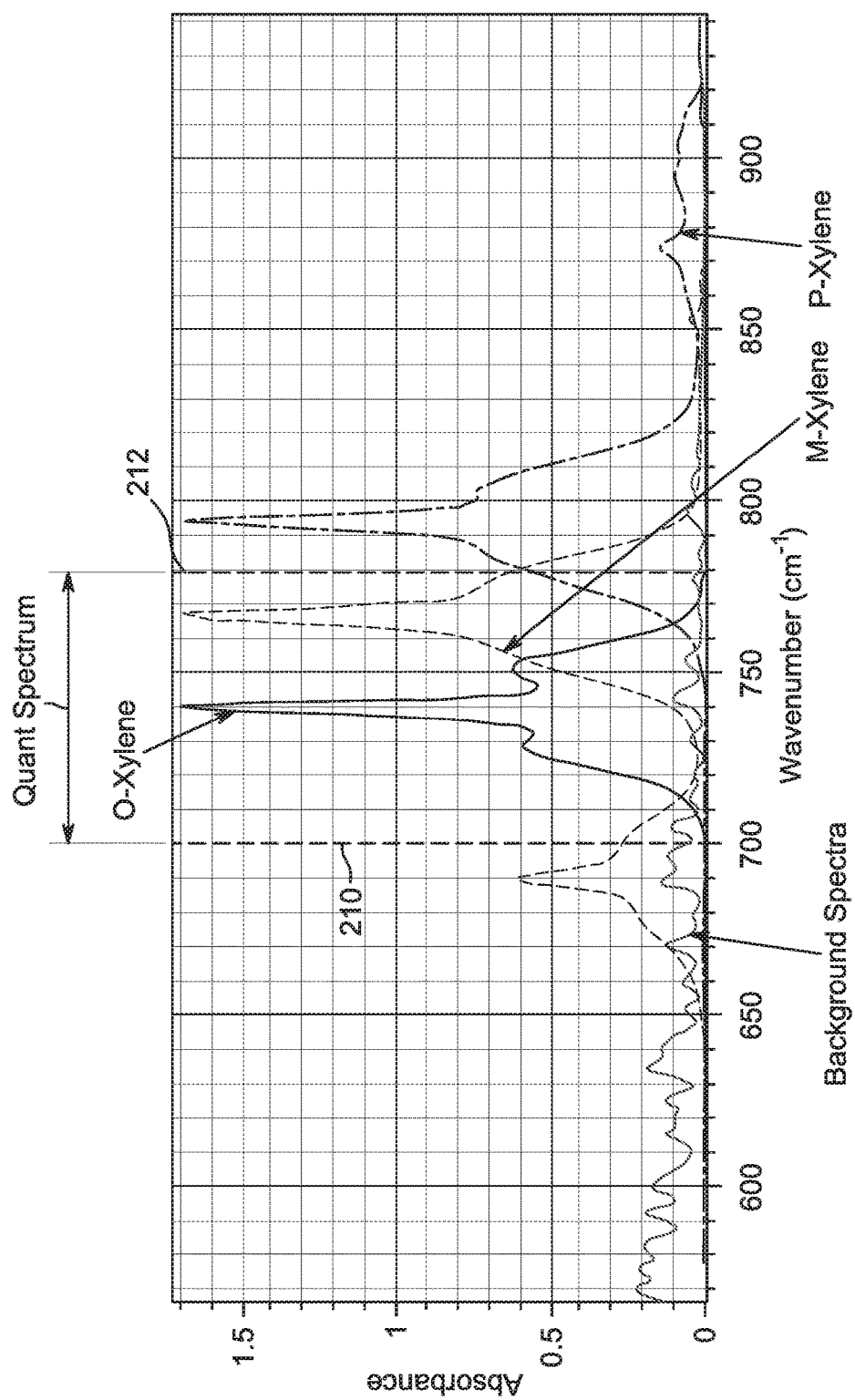
FIG. 4 is a graph of the absorbance as a function of wavenumber for m-xylene and p-xylene and the overlap with the quant spectrum for o-xylene along with an exemplary background or interferent spectra.

In FIG. 4, the quant region of o-xylene sits slightly in a water interference and overlaps with p-xylene and m-xylene. The 700 to 780 wavenumber region is usually used as the quant region for this compound.

Having compound's spectral features overlap water would not necessarily be an issue in itself if it were not for other complicating factors. The signal of some gases can be deeply obscured by interferences such as water, $CO_2$, other known and even unknown gases present in the sample.

In general, it is important to monitor and measure a signal that in some cases is less than one tenth of the signal of the interference or less. Minor errors in calculating the concentration of the interference can significantly affect the ability to accurately measure the compound of interest. To complicate matters further, common interferences like water and $CO_2$ can have their spectra change slightly as pressure changes. In some cases, however, as time moves forward, the pressure rises in the gas cell where the spectral measurement is made which can slightly change the spectral features of the interferences.

In general, the sample spectra are being used as reference spectra. That is, background or interferent removal is a technique born out dealing with the problems described above. This technique uses sample spectra (not reference spectra from a gas spectral library) that occur in time before and after the gas of interest has eluted from the GC. These background or interferent spectra contain spectral features for water and $CO_2$ and/or other interferants at the same pressure as the sample being analyzed. Hence the background spectra can act as a pressure corrected reference spectrum for interferants such as water and $CO_2$. Moreover, the use of sample spectrum as interferences in regression can also handle the interference effects of unknown gases in the sample.

In more detail, the use of the background or interferent spectra to remove the contributions of the interferants provides the best possible match to any feature, since they were collected moments before or moments after the analyte of interest passed into the sample cell 100. For example, reference spectra from a library can match to about 1% on a point by point basis. Spectra collected by the same instrument just prior or after the analyte can match to 0.1%, or better. This can generate residuals 10 times better and potentially reduce method detection limits (MDLs) by a factor of 10 or potentially more when a strong interferent is present.

In operation, the controller 11 identifies the compounds flowing into the gas cell 100 by analyzing the sample spectra detected by the spectrometric system 60 before and/or after the compound or compounds of interest is/are eluting to remove a background spectrum to thereby better obtain the spectra associated with the compound or compounds of interest.

Figure 2:
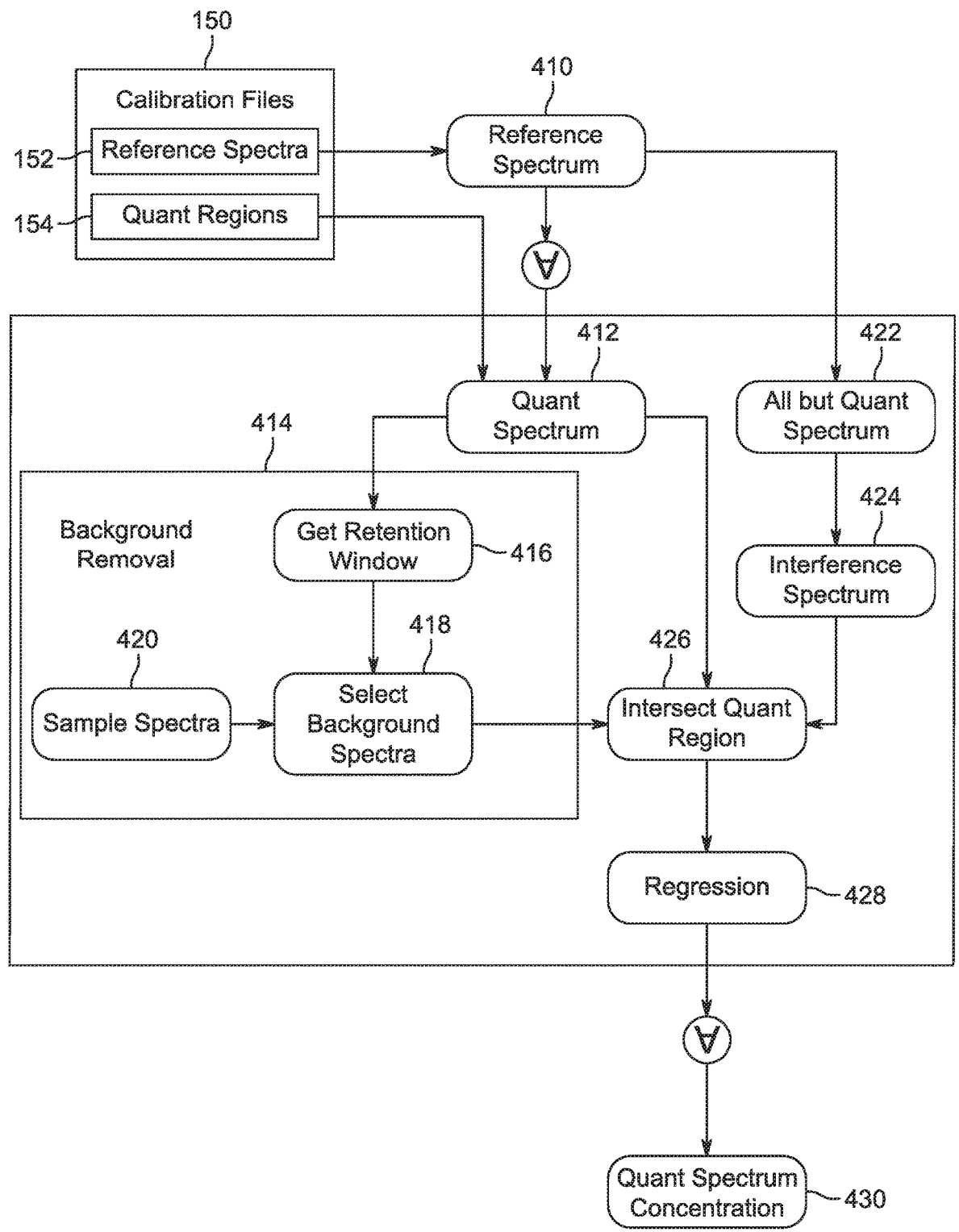
FIG. 2 is a flow diagram illustrating the operation of the analytics process executed by a computer system, such as a controller, including the background or interferent removal technique according to the present invention.

FIG. 2 illustrates the background removal process according to the principles of the present invention that is performed by the controller 11 of the system 10 and/or possibly a second computer system that analyzes the spectral information including sample spectra from the controller 11. This process depends on knowing when a compound is eluting or how the different compounds will tend to elute from the GC 50 and flow into the sample cell 100.

Figure 3:
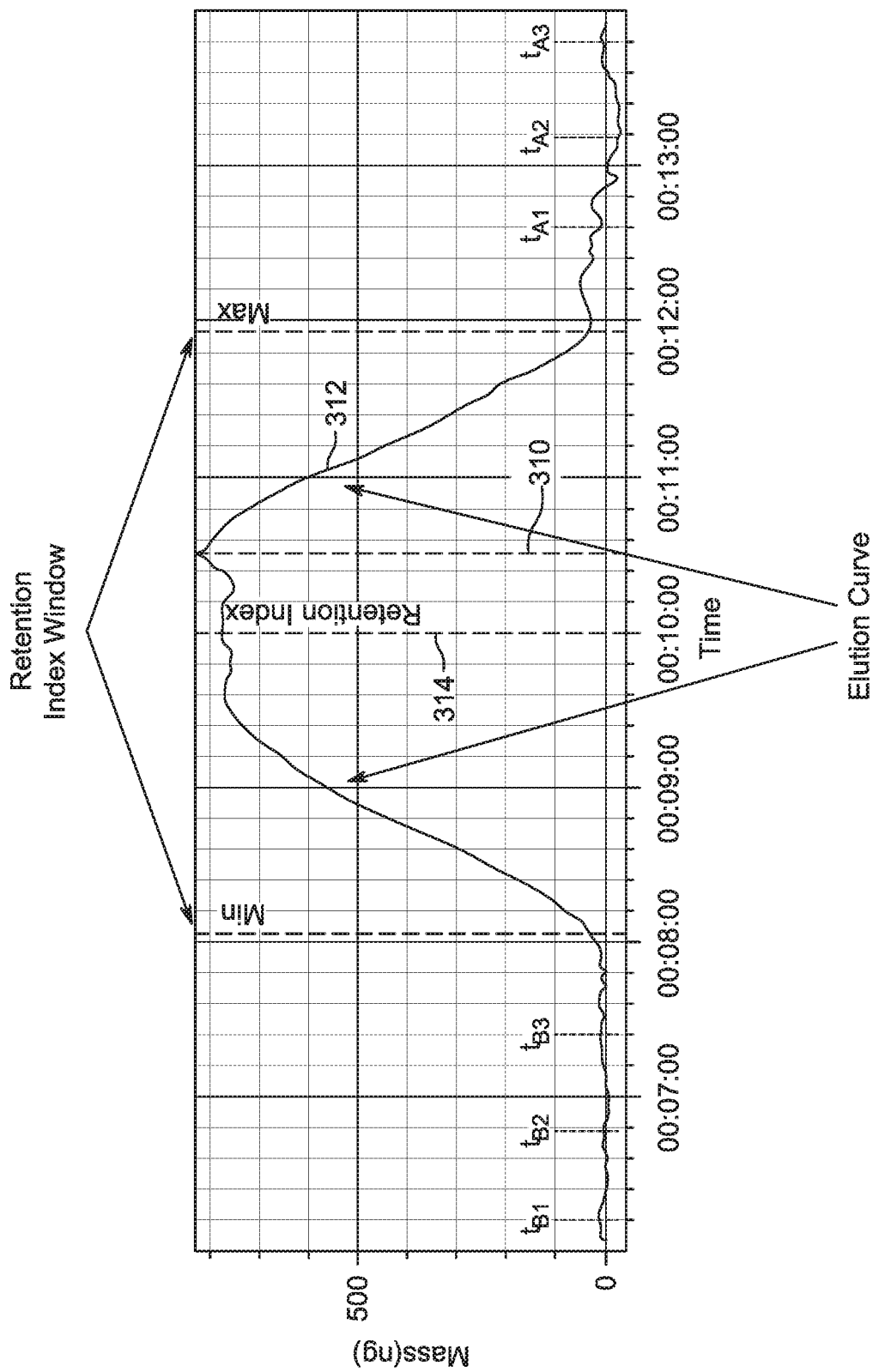
FIG. 3 is a graph of the elution curve showing the detected concentration of the compound of interest as a function of time.

FIG. 3 is a graph of the elution curve showing the detected concentration 312 of the compound of interest as a function of time. This shows how an exemplary compound would elute from the GC 50. The time interval defining when a particular compound will elute is known as the retention index window which extends from the Min line to the Max line. The retention index 314 is defined as the middle of this window. From a spectrum perspective this is seen as the time period over which the concentration of the compound eluting from the GC starts close to zero, rises to a peak at time 310 and then returns back close to zero again. This analysis of elution is performed for each compound in the sample.

In step 410 of FIG. 2, a reference spectrum for the compound of interest and reference spectra for any possible interfering compounds are selected. These reference spectra 152 are used to analyze the sample spectra provided by the spectrometric system 60. These reference spectra 152 are typically part of the calibration files 150 stored on the controller 11 and are typically based on published libraries of spectra for various pure gases.

In general, reference spectra are only required for the compounds or analytes of interest, i.e., the compounds that are to be measured. Reference spectra are not required for every compound in the sample, however. Thus, when using the present approach, the effects of outliers or interferences on the measurement of the analytes or compounds of interest is minimized.

In step 412, the quant regions 154 of the reference spectrum for the current compound of interest are accessed from the calibration files 150. Typically, these quant regions 154 are user-defined or selected based on published suggestions. In a preferred embodiment, multiple, spectrally discontinuous and/or isolated regions can be selected for each compound of interest.

For example, with reference to FIG. 4, if the compound of interest is o-xylene, to use a specific example, then a quant region of between 700 and 780 wavenumbers might be used.

The one or more isolated quant regions of the reference spectrum are then used as an input to a number of steps that are associated with background removal 414. Generally, the process determines the background spectra within the quant regions.

To obtain the background spectrum, a baseline retention window is identified in step 416. Generally, this retention window might be obtained by reference to published standards for the specific compound interest. In other cases, if there is experience on the given instrument, then this retention window may be based on past runs on this instrument under similar conditions.

The retention window determined in step 416 is used to obtain a set of sample spectra that were acquired spectrometric system 60 both prior to the beginning of the elution of the compound of interest and after that compound of interest has concluded eluting in step 420.

For example, with reference to FIG. 3, sample spectra at times $t_{B1}$, $t_{B2}$, $t_{B3}$ are selected before the compound of interest has begun eluting by reference to the elution curve 312 and the retention index 314. In one example, these three spectra might be acquired at intervals of several minutes with respect to each other.

Similarly, sample spectra at times $t_{A1}$, $t_{A2}$, $t_{A3}$ are selected after the compound of interest has finished eluting also by reference to the elution curve 312 and the retention index 314.

From this information (i.e., sample spectra at times $t_{B1}$, $t_{B2}$, $t_{B3}$ and sample spectra at times $t_{A1}$, $t_{A2}$, $t_{A3}$) one or more background or interferent spectra are calculated in step 418. Specifically, in a current embodiment, the sample spectra at each times $t_{B1}$, $t_{B2}$, $t_{B3}$ and the sample spectra at each times $t_{A1}$, $t_{A2}$, $t_{A3}$ are used in a regression matrix calculation. As a result, the background or interferent spectra account for spectral differences arising from unknown compounds and/or changing pressure in the sample cell 100. In examples, the calculated background spectra might be an average or weighted average of the sample spectra at times $t_{A1}$, $t_{A2}$, $t_{A3}$, $t_{B1}$, $t_{B2}$, $t_{B3}$, and some of these spectra may be excluded. In a current embodiment, however, all of the spectra, both before and after the elution of the compound of interest are used in the regression matrix calculations used to quantify the amount of the compound of interest.

In step 422, the reference spectrum acquired in step 410 is also used to generate a spectrum that excludes the quant regions for interfering compounds. This is used to define the interference spectra in step 424. In general, the interference spectra are used to identify and quantify other compounds of interest that may be co-eluting with the current compound of interest. These other compounds will have retention curves that overlap with the compound of interest and thus cannot be excluded solely by reference to the background or interferent spectra that are based on the sample spectra at each times $t_{B1}$, $t_{B2}$, $t_{B3}$ and the sample spectra at each times $t_{A1}$, $t_{A2}$, $t_{A3}$ These other compounds of interest are incorporated into the regression matrix when their spectral features overlap the quant region of the quant spectrum and co-elute with the compounds being quantified. Note that each compound making up the interferences will eventually run through this process of FIG. 2 as the quant spectrum. That is, each compound gets its turn to be the quant spectrum.

For example, when quantifying for o-xylene, the process uses only the part of the o-xylene's reference spectrum that lies in between the lines 210 and 212 in FIG. 4. The process takes portions of m-xylene, p-xylene reference spectra and the background sample spectrum that also lie between the two lines 210, 212. This is what is meant by intersects the interference spectrum. These intersected spectra become the regression matrix that is used to compute only the concentration of o-xylene. This intersection process is then repeated using the quant region of m-xylene, for example, to compute m-xylene's concentration. In the case of computing m-xylene's concentration using the process of FIG. 2, m-xylene's quant region would be centered around the region defined from about 740 to 800 wavenumbers.

The concept of interference comes from the fact that for each quant spectrum is only a subset of the reference spectrum of the compound of interest. This subset is termed the quant region. There are many reasons only a subset of the quant spectrum is used for quantification. They include, non-linear distortions of the sample spectrum baseline, avoiding heavy interference regions with other gases in the sample, and avoiding signal distortion regions of the sample to name a few. Even though a subset of the quant spectrum for a particular compound is used, there are still spectral features outside of the quant region that have to be taken into account when quantifying other gases using the other quant regions. When the regression is run to "fit" the quant spectrum, the process will be intersecting the compound's quant region with the interference spectrum. These intersections are fed in the regression. These intersections represent subsets of the interference spectra but are not necessarily the same as the quant regions for the interference gas.

For example, with reference to FIG. 4, the spectra of m-xylene and p-xylene will overlap with the quant spectrum for o-xylene. The spectrum region of o-xylene sits slightly in a water interference and overlaps with significant spectral features of p-xylene and m-xylene. Moreover, from experience, it is known that these other compounds will elute at approximately the same time as the compound of interest due to their similar retention indices.

In step 426, the degree to which these other co-eluters spectra overlap with the quant region of the compound of interest is determined.

This information is then fed into the regression matrix in step 428. In one example, the regression performs a least-squares fit with the reference spectra for the interfering compounds, background spectra, and the reference spectrum for the compound of interest. Further, a baseline correction also preferably added. This yields the concentration for the compound of interest in step 430. In general, the output of regression are scalar coefficients for each of the spectrum fed into it. These scalar coefficients are then used to compute the actual compound's concentration.

The process of FIG. 2 is then performed for the next component or compound of interest, using the selected quant regions for that compound and its retention index.

In operation, when analyzing sample spectra, the regression is being run multiple times—once for each compound of interest. When a regression is run to compute the concentration for compound 1, coefficients are also generated for the other compounds in process. These other calculated coefficients are ignored and discarded. The reason is that the regions being used to compensate for the interference effects of these other compounds have on computing compound 1 are not necessarily good at computing the concentration of these other compounds. Hence each compound has its own "optimal" quantification region defined and each compound is quantified or "regressed" at that "optimal" region to get its concentration.

Retention Window Optimization

The background removal algorithm needs fairly accurate retention index window information to function. If the background spectra were acquired too far in time from the retention window, the error increases in the regression performed in step 428, putting in question the accuracy of the calculated concentrations.

On the other hand if the background spectra are inside of the retention window then they include spectra that contain the compound being quantified. In this case, regression performed in step 428 will remove from or in some cases add to the concentration of the compound being quantified.

This gives an inaccurate value for the concentration. This situation is especially concerning since these fits tend to look good from an error or R-Squared perspective leading to false reporting.

The baseline retention window, obtained by reference to published retention indices, tends to be too inaccurate for several reasons. First, when the gases are collected in thermal desorption tubes (TDT) prior to being analyzed, these TDTs tend to be less accurate when releasing gases during analysis. This adds some error in knowing when each gas should be eluting. Second, the samples can often contain large amounts of water or other interferents. The high concentrations of water tend to push out the retention times of other gases in the sample.

Figure 5:
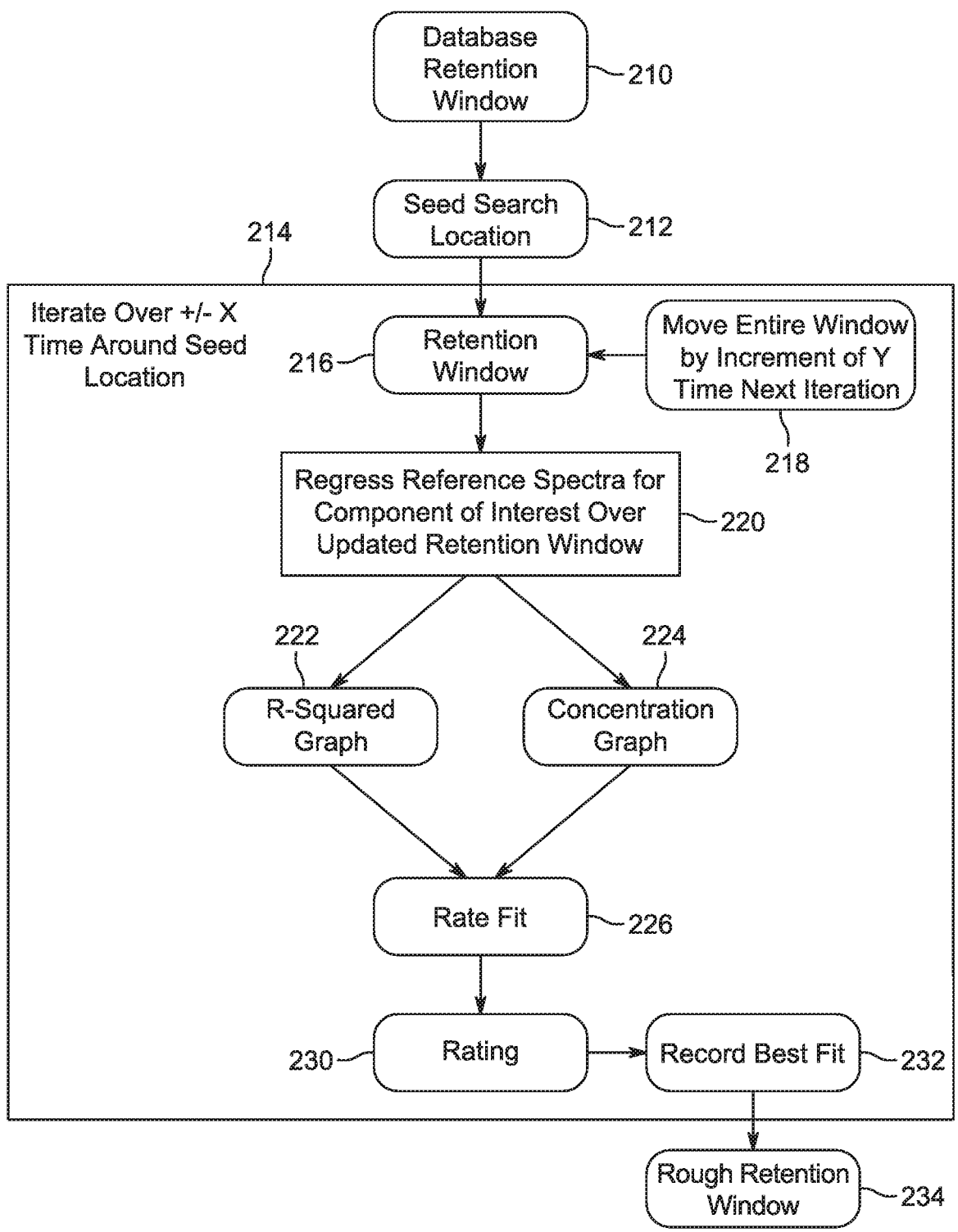
FIGS. 5 and 7 are flow diagrams illustrating a method for optimizing the retention window for a given compound of interest in which the center of the window is moved in wavenumber (FIG. 5) then either end of the window is optimized (FIG. 7)
Figure 7:
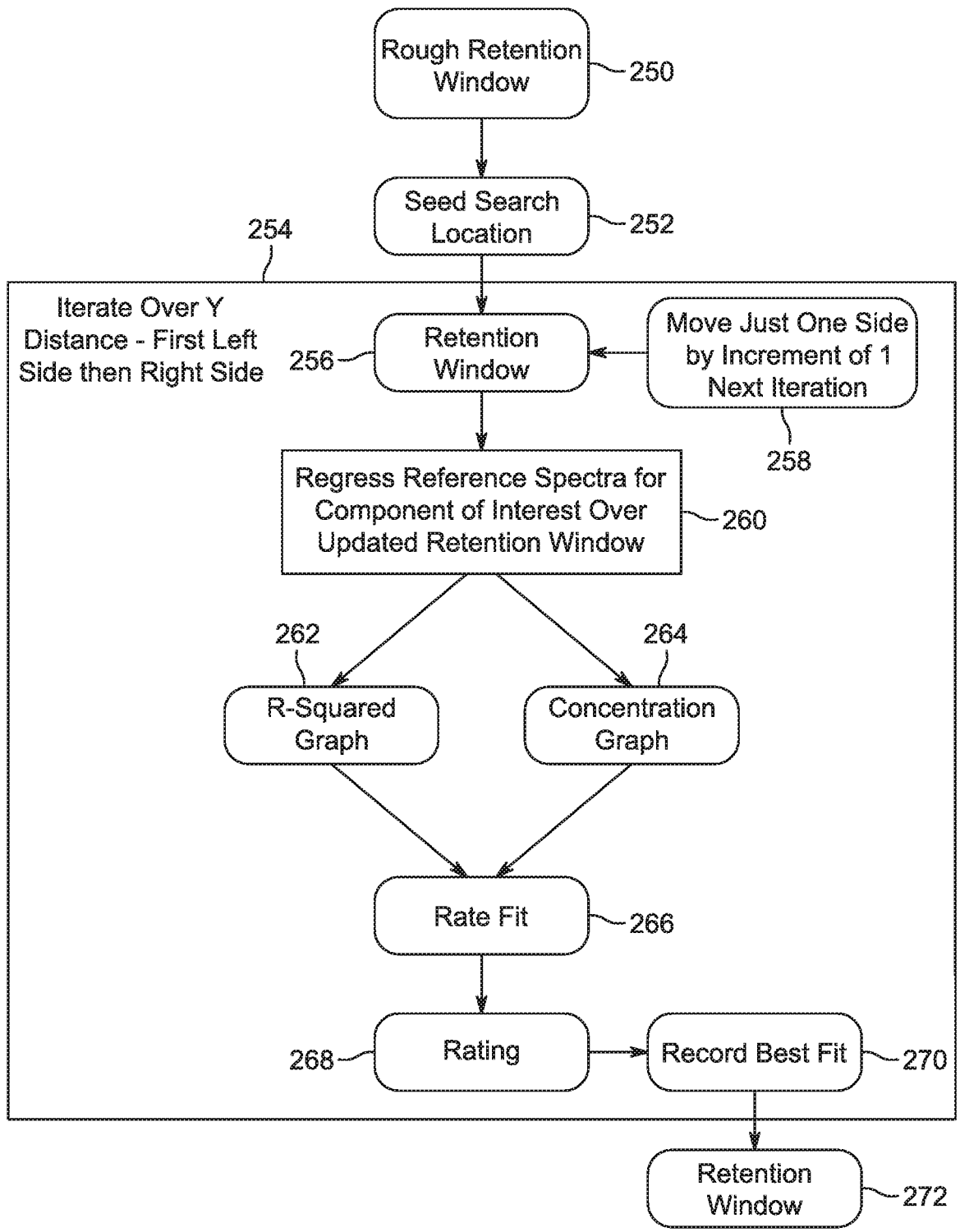

FIGS. 5 and 7 are flow diagrams illustrating a method for optimizing the retention window for a given compound of the sample performed by the controller 11 or other computer system for a specific analysis run for the system 10. This method more accurately finds the retention window of each compound being analyzed and quantified.

The method is split into two phases. As shown in FIG. 5, the process first moves the entire retention index window around to find a better rough approximation of the retention window. Then, in a second phase shown in FIG. 7, the process fine tunes the rough retention window by moving only the left side and afterwards moving only the right side.

In more detail, in step 210 of FIG. 5, a baseline retention window is obtained. Typically this is a published value. Then, in step 212, this baseline retention window is used to seed the search for a "rough" retention window.

In section 214, the retention index window boundaries are updated or adjusted to several different locations in time around the baseline window location. Specifically, in step 218, a new window location is incremented by a time Y. This yields the new retention window location in step 216.

For each time location, in step 220, a regression is calculated using a reference spectrum for the compound of interest over the quant spectrum for that compound against the sample spectra that were collected by the spectrometry system 60 over the course the entire updated retention window. Controller 11 does this using a modified version of background removal. The output of regressing over the entire retention window is an R-Squared graph in step 222 and a concentration graph in step 224.

The fit is then rated in step 226 based on the middle 50 percent and how good the fit is between the reference spectrum and the sample spectra for the different locations in time around the baseline window location. The fit for each window is penalized if it shows the concentration of the compound of interest having a negative concentration. The reason only the center 50% of the graph is considered is because R-Squared (fitting) usually drops off as the concentration of the gas of interest drops off. This drop off happens at both ends of the elution curve.

Figure 6:
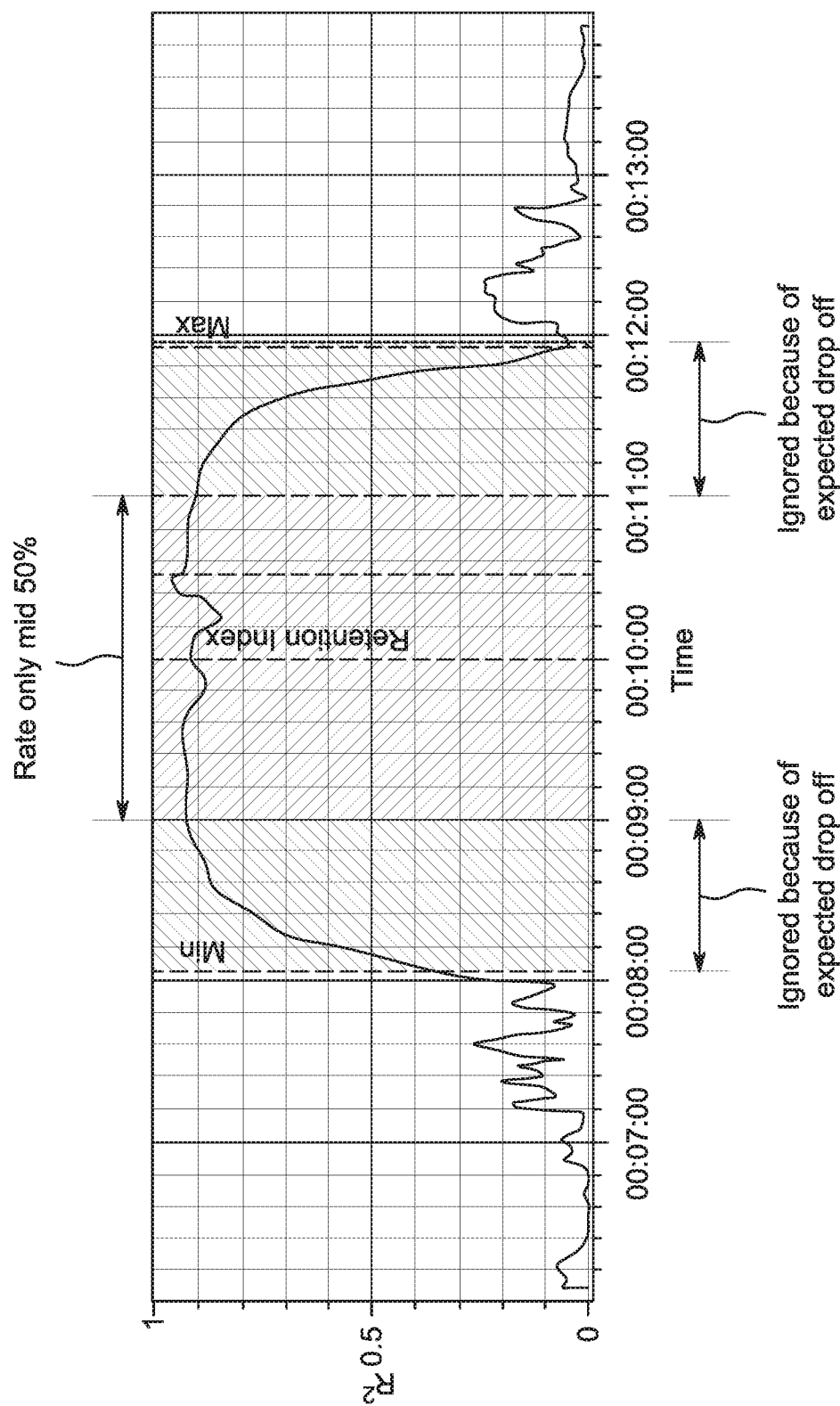
FIG. 6 is a graph of R-Squared as a function of time showing how the fitting is only performed for a portion (the center 50%) of the retention curve.

FIG. 6 is a graph of R-Squared as a function of time. It shows how the fitting is only performed for a portion of the retention curve, such as less than 75% of curve. In the illustrated example, the center 50% portion of the curve is used. Specifically, in the illustrated example, the fitting is performed between 9:00 and 11:00 along the time axis.

These fits are then associated with the retention windows at the different locations in step 230.

All of the fits for the different retention window locations are compared in step 232 and the retention window location with the best fit is determined in step 234. This is termed the rough retention window.

FIG. 7 shows how the extent of the rough retention window is further refined.

In more detail, in step 250, a rough retention window is obtained for the compound of interest. Typically this is determined as described in connection with FIG. 5. Then, in step 252, this rough baseline retention window is used to seed the search for the final optimized window.

In section 254, the retention index window boundaries for the right side and the left side are separately updated or adjusted to several different locations in time around the rough window location. Specifically, in step 258, a new window location is incremented. This yields the new retention window location in step 256.

For each time location, in step 260, a regression is calculated using a reference spectrum for the compound of interest over the quant spectrum for that compound of interest against the sample spectra for the entire updated retention window. The output of regressing over the entire retention window are R-Squared graphs in step 262 and concentration graphs in step 264 for each adjusted window.

The fit is then rated in step 266 based on the middle 50 percent and how good the fit is for each of the windows. The fit for each window is penalized if it shows the concentration of the compound of interest having a negative concentration.

This fit is then associated with the retention window at that location in step 268.

All of the fits for the different retention window locations are compared in step 270 and the retention window location with the best fit is determined in step 272. This is final optimized retention window.

This optimized retention window is used in place of the baseline retention window in the background removal process described in connection with FIG. 2, in order to obtain a more accurate concentration for each compound of interest.

Modified Background Removal for False Peaks

The retention index window optimization method outlined with respect to FIGS. 5 and 7 uses a modified version of background removal. Specifically this version has to compensate for when the suggested retention window has one of its boundaries lying within the true elution window of the compound of interest. This will cause the background spectrum to contain the gas or compound of interest and if this happens, the phenomenon of false peaking will occur.

When fitting the reference spectrum to the sample spectra, the regression may find that the best fit is created by having a negative scale. In a current embodiment, negative scales (negative concentrations) are allowed to happen. However when this happens with background spectrum that contains the compound of interest, there is an effect where the concentration peak is manufactured. Regression will essentially add the gas to the sample through the negative scale factor applied to the background spectra. These false peaks can have a good fit quantity and be picked up as the best rated fit. This should be avoided.

To address this issue, background spectra are removed if regression produces a negative scaling factor for it (actually <−0.1 scale). The negative background spectrum is removed and the regression is run again. The process is repeated until there are no more background spectra to remove or there are no longer negative background spectra.

These graphs are feed into a rating algorithm, where only the center 50% of each graph is examined. The rating algorithm primarily averages the R-Squared over that interval. The rating gets a negative contribution when the concentration goes negative.

Retention Window Validation

In the past, most chromatographers have used internal standards to set the retention time and index axis. Also retention times for an instrument can be determined and calibrated by spiking the instrument with known compounds in known concentrations.

The following approach assesses retention windows by analyzing the adjusted, optimized retention windows. A determination is then made as to how much each of the retention windows for each of the compounds of interest has been shifted in time. The median of these time shifts is calculated. Then, the controller 11 reports on any compounds that had their retention windows adjusted by more than the median adjustment. This is used to highlight possible errors in the calculation in the concentrations of those compounds.

In more detail, the processes described in FIGS. 5 and 7 use high goodness of fit using a reference spectrum for the compound of interest over the quant spectrum for that compound of interest against the sample spectra for the entire updated retention window to determine the likely retention window for a compound of interest in a sample.

Generally, the retention time is the measure of the time taken for a solute to pass through the chromatography column 48. It is calculated as the time from injection to detection and is generally affected by such factors as gas flow rate, temperature, and column age and length. On the other hand, relative retention time is the ratio of the standard retention time to the sample's actual retention time.

Even given the same column and conditions, there will be some differences in retention times for the same compound over the course of a several days. And, in samples with large amounts of water, the retention times can be shifted out in time even more.

One way to compensate for the varying retention time is to use an internal standard to calibrate the variations. When using an internal standard, a known compound is added to the sample. Then during the analysis of the sample, the timing for the peak of the internal standard is used to adjust the expected timing of the other peaks using the relative retention times. The ratio of the internal standard peak to the other peaks is used. These ratios should be relatively consistent over multiple runs. Essentially relative retention time is a normalized retention time.

Figure 8:
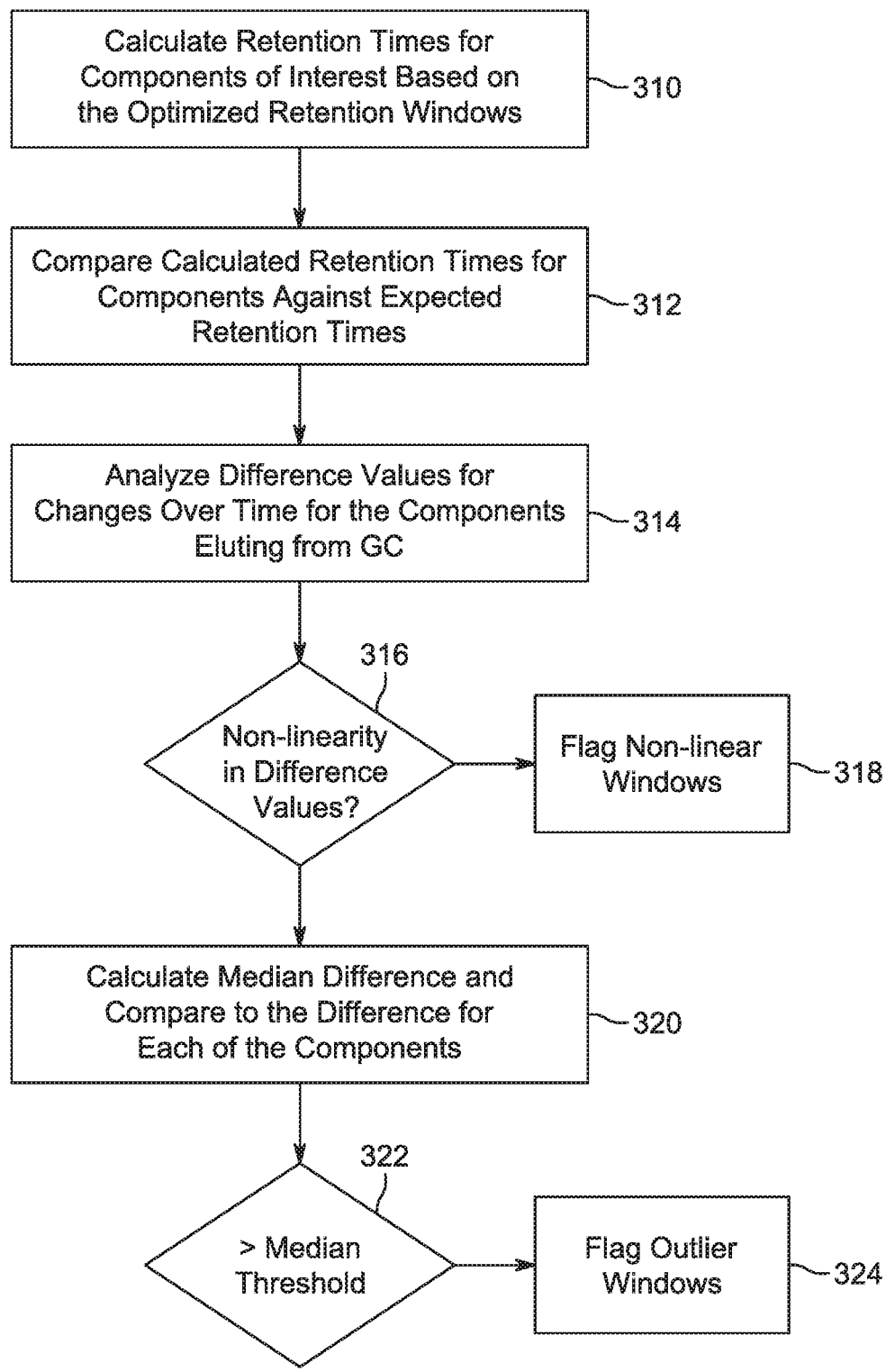
FIG. 8 is a flow diagram showing a process for validating calculated retention times for the compounds of interest executed by a computer system such as the controller.

FIG. 8 shows a process for validating calculated retention times for the compounds of interest from the analysis of a sample by the controller 11 without relying on the use of an internal standard, for example.

As described above, in the present system, the optimized retention windows are determined by matching the reference spectra curves and picking optimized retention windows based on a high goodness of fit with the sample as outlined in the flow diagrams of FIGS. 5 and 7. This process yields the optimized retention windows and from the optimized retention windows the "calculated retention times" are determined for each of the compounds of interest in the sample in step 310.

Then, in step 312, the controller 11 compares the calculated retention times with the "expected retention times" as are stored in a retention index database. The expected retention times can be based on published standards and/or validated previous runs of the GC 50. This analysis is performed for each of the compounds of interest. A "difference" is calculated for each of the compounds of interest based on the difference between the expected and the calculated times. And the database is sorted by the expected or calculated times.

An example of such a database is shown in the following Table I:

| Gas | Expected (min:sec) | Calculated (min:sec) | Difference (min:sec) |
|---|---|---|---|
| Benzene | 10:11 | 11:47 | 01:36 |
| Toluene | 14:00 | 14:41 | 00:45 |
| Ethylbenzene | 17:58 | 18:36 | 00:38 |
| p-Xylene | 18:43 | 18:30 | −00:13 |
| m-Xylene | 19:26 | 18:45 | −00:39 |
| o-Xylene | 20:11 | 19:26 | −00:37 |

A number of different validations are then performed on the optimized retention windows based on the calculated and expected retention times.

In step 314, the calculated differences are analyzed to determine whether they are shifting in a constant fashion and whether the shifting is linear over the course of the GC run.

In an ideal scenario, the differences would be constant across the different compounds or be changing in a linear (or otherwise predictable) fashion over time for the different compounds eluting from the GC 50 over its run. However, if it is determined that the changes are non-linear by greater than a linearity threshold in step 316, then some or all of the optimized retention windows are flagged as being possibly being incorrectly calculated/found in step 318 depending on which of the windows violate the linearity criteria.

In step 320, the differences for each of the compounds of interest is also compared to the median difference for all of the compounds in step 320.

So given the above Table I, the median difference=12.5. The difference can also be calculated based on the magnitudes of these numbers. The below Table II calculates how much each difference varies from the median:

| Gas | Calculated-Median (min:sec) |
|---|---|
| Benzene | 01:23.5 |
| Toluene | 00:32.5 |
| Ethylbenzene | 00:25.5 |
| p-Xylene | −00:25.5 |
| m-Xylene | −00:51.5 |
| o-Xylene | −00:49.5 |

Then, it is determined if any particular compound difference deviates from the median difference by greater than a median threshold in step 322. That compound is then flagged as possibly having an incorrectly calculated/found retention window in step 324.

In the current embodiment, compounds in which the calculated retention times deviate from the expected retention time by a median threshold over the median (median threshold=1 minute) get flagged as possibly having an incorrectly calculated/found retention window.

In general, a number of scenarios could lead to corrected retention windows. For example, the algorithm using R squared computed the wrong retention index. This may be caused by false peak or the fact the compound is not present at all in the sample. Alternatively, the problem can also arise if the retention index database data (expected) are inaccurate or the carbon ladder calibration is inaccurate/out of date.

It is up to the user to determine what action if any to take when computed retention times get flagged.

Figure 9:
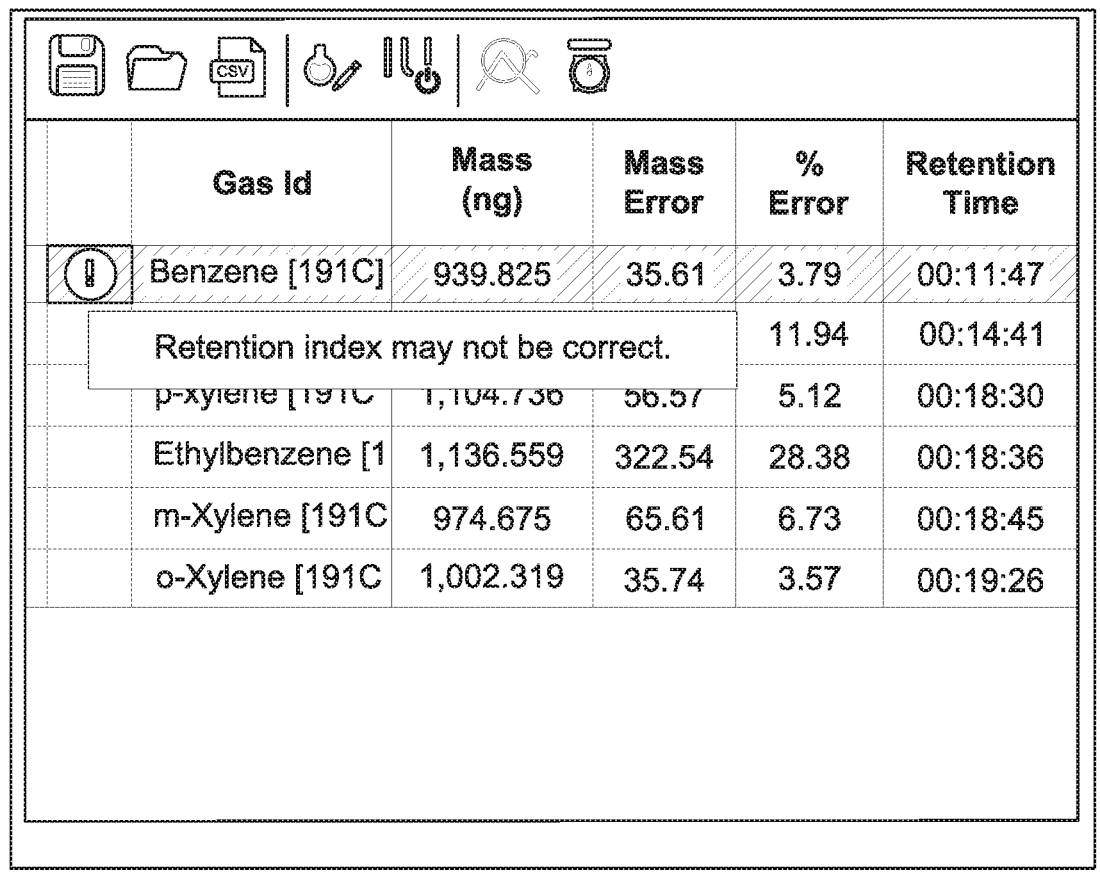
FIG. 9 shows an example of a user interface generated by the controller or other computer system indicating a possibly incorrectly calculated/found retention index.

FIG. 9 shows a window of the user interface 16 presented on the display 16 by the controller 11 or other computer system indicating a possibly incorrectly calculated/found retention index. In the example, benzene exceeds the threshold (01:20) and subsequently gets flagged in the user interface generated by the controller 11. FIG. 9 shows an example of such a user interface and shows the highlighting of the field for benzene and the displayed annotation: "Retention index may not be correct."

Quant Region Definition

The analytical process executed by the controller 11 or other computer system allows multiple quant regions to be defined in the reference spectrum for each compound of interest. This allows discontinuous quant regions to be defined, each being independently baseline correctable.

Multiple quant regions for reference spectrum for a compound of interest can provide a number of advantages. By increasing the size of the quant region, the analytics process increases the confidence that the gas of interest has actually been found and is not a false match.

Larger/more quant regions, however, also create challenges. There is a risk of having more interference with other gases in the sample—translating into higher concentration errors. And baseline drift also plays a bigger part in error as any region's size is increased.

Nevertheless, by allowing the quant regions to be discontinuous, the analytical process excludes low information/high interference areas of the reference spectrum and baseline correct each quant region separately.

The analytical process provided by the controller 11 enables a user to define multiple quant regions for the reference spectrum for a compound. Then, via user control, the analytical process executed by the controller 11 quants the compound of interest using potentially only a single region. On the other hand, via user control, the analytical process can switch between quant regions when one region proves to not be working well on a given sample.

Figure 10:
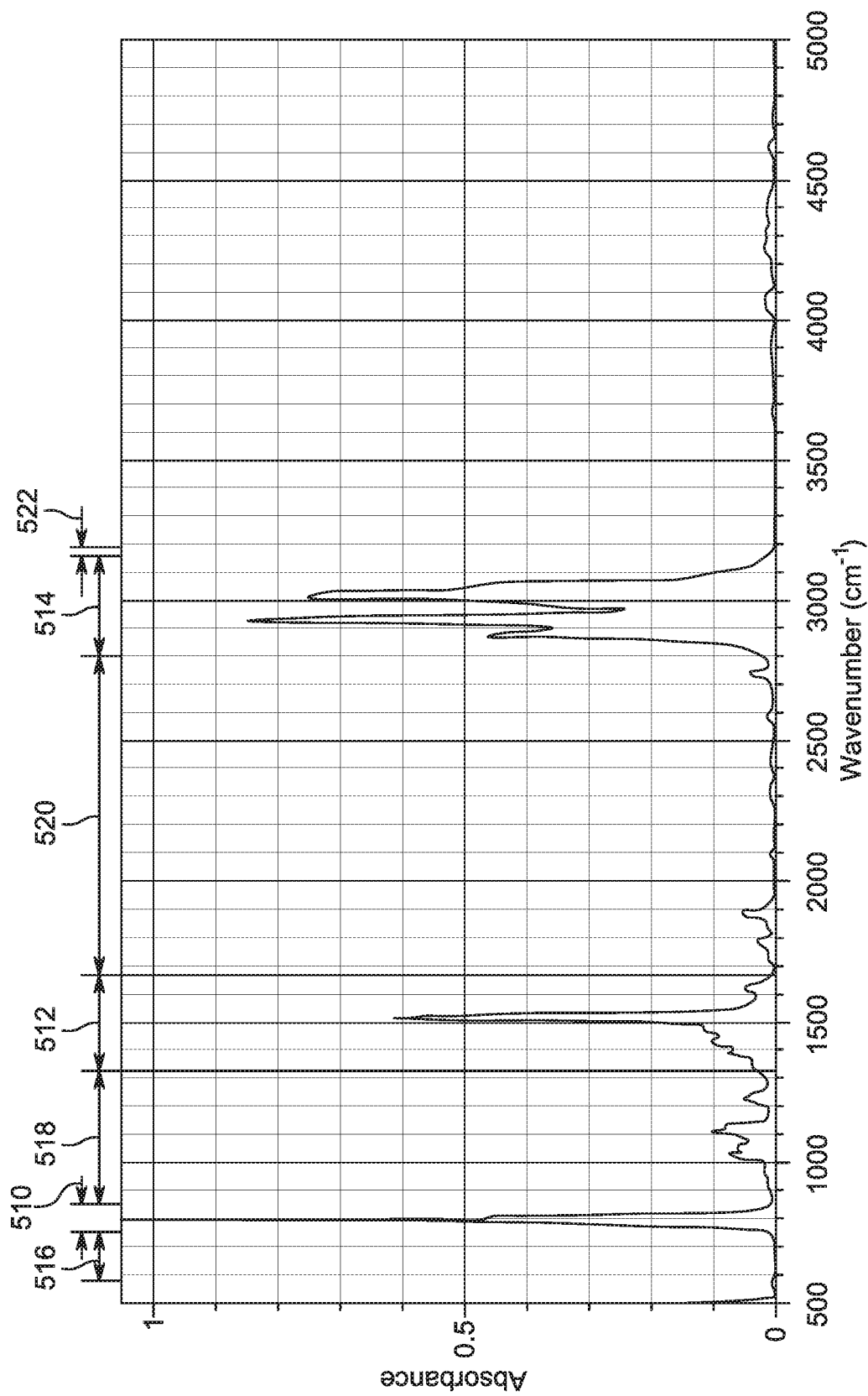
FIG. 10 is a plot of absorbance as a function of wavenumber illustrating an exemplary reference spectrum with multiple quant regions.

FIG. 10 shows an exemplary reference spectrum with multiple quant regions being defined for it.

As illustrated, each reference spectrum has only one primary quant region 510, but any number of secondary quant regions 512, 514 and any number of interference regions 516, 518, 520, and 522.

Figure 11:
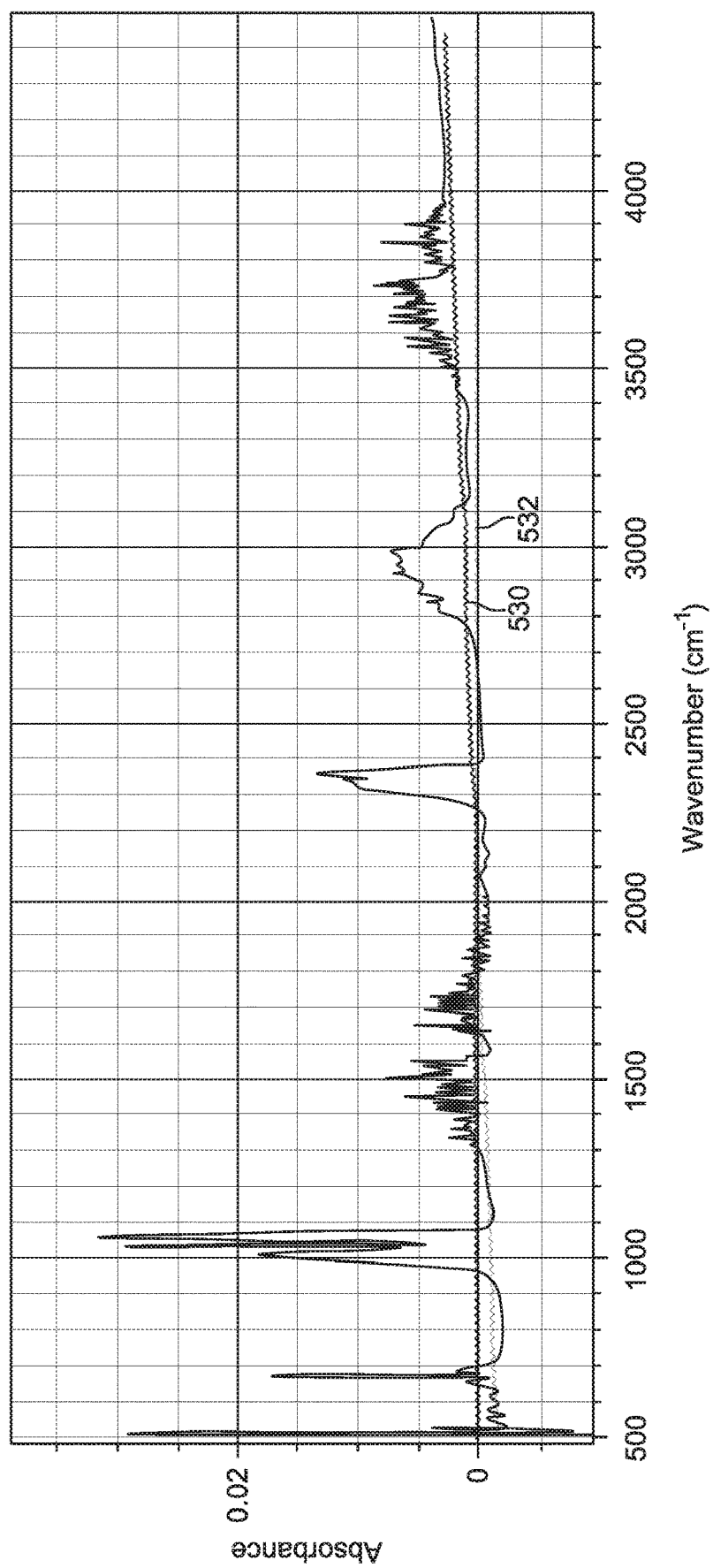
FIG. 11 is a plot of absorbance as a function of wavenumber showing an exemplary sample spectrum exhibiting baseline drift.

One common problem that arises concerns the fact that a sample spectrum can be offset from zero. As illustrated in FIG. 11, the sample spectrum's baseline 530 is tilted compared to the graph's Y zero point 532. This is termed baseline drift.

In general, baseline drift tends to be non-linear across the entire sample spectrum. However in relatively small neighborhoods of the sample spectrum, it can be approximated to be linear without incurring too much error.

The analytical process executed by the controller 11 compensates for baseline drift by incorporating a line into the regression as an unknown interference. In fact, in the current embodiment, the baseline correction line is actually split into two lines for regression. This is to allow the baseline offset and baseline slope of the baseline correction to be fitted independently by regression.

When the reference spectrum contains multiple quant regions that are spread out in wavenumber, then using a single line to correct the baseline drift is not ideal. The baseline drift is not linear in general and should only be treated as linear in small localized regions.

In the preferred embodiment, the analytical process uses a separate set of baseline vectors for each of the quant region. And, each baseline segment is clipped to the quant region it is correcting.

Figure 12:
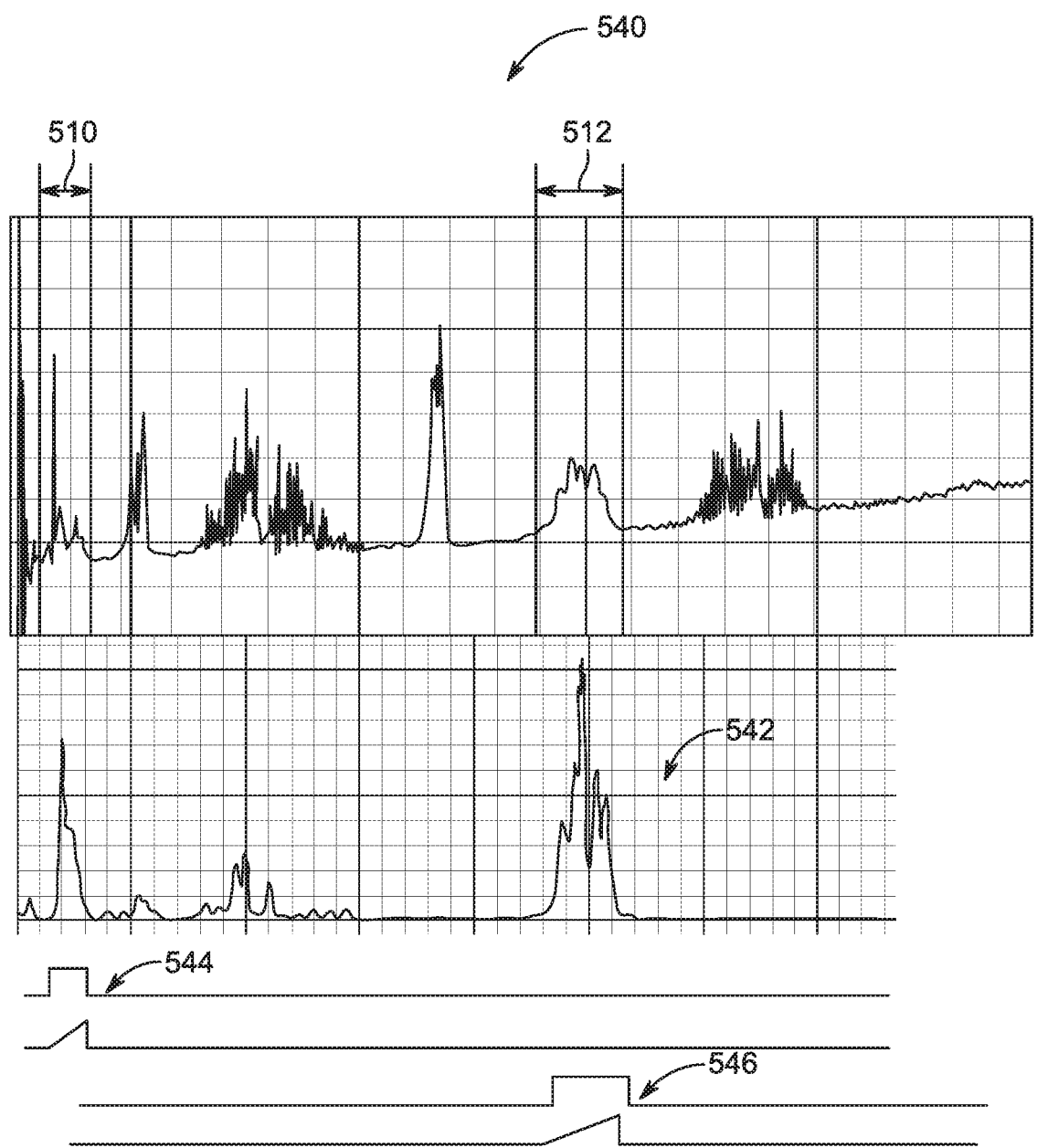
FIG. 12 are plots as function of wavenumber showing a sample spectrum, a reference spectrum and baseline correction vectors two quant regions.

FIG. 12 shows a sample spectrum 540 exhibiting baseline drift. The figure also shows a reference spectrum for ethylbenzene 542 for which a primary quant region 510 and a secondary quant region 512 have been defined and shown with respect to the sample spectrum. Finally the figure shows baseline correction vectors 544 for 650 to 830 wavenumber quant region and baseline correction vectors 546 for the 2800 to 3150 wavenumber range.

These baseline correction vectors 544, 546 allow each quant region of the 510, 512, of the sample spectrum 540 respectively to be baseline corrected independently.

This structure also has a mathematical implication as well. The drop off to zero outside of the quant region insures that the resulting regression matrix (AT*A) will remain invertible and hence still solvable.

As an example, if the spectrum had two quant regions and each is allowed to extend across both regions, then the baseline vectors for region 1 could be expressed as simple scalar factors of the baseline vectors of region 2.

$$BConstant_1 = C*BConstant_2$$

$$BSlope_1 = D*BSlope_2$$

C and D being scalar constants.

The vectors $BConstant_1$, $BConstant_2$, $BSlope_1$ and $BSlope_2$ are just columns of the matrix. The fact that these vectors can be expressed as scalar multiples of each other means they are not linearly independent columns—and hence the resulting regression matrix will not be solvable.

Defining multiple quant regions in the reference spectra has value to the users even if they do not quant with multiple regions. Users can quickly alternate between quant regions. This is useful for gases like Ethylbenzene. Sometimes the 650 to 830 region works well for quantifying and other times the 2800 to 3150 region works well.

Figure 13:
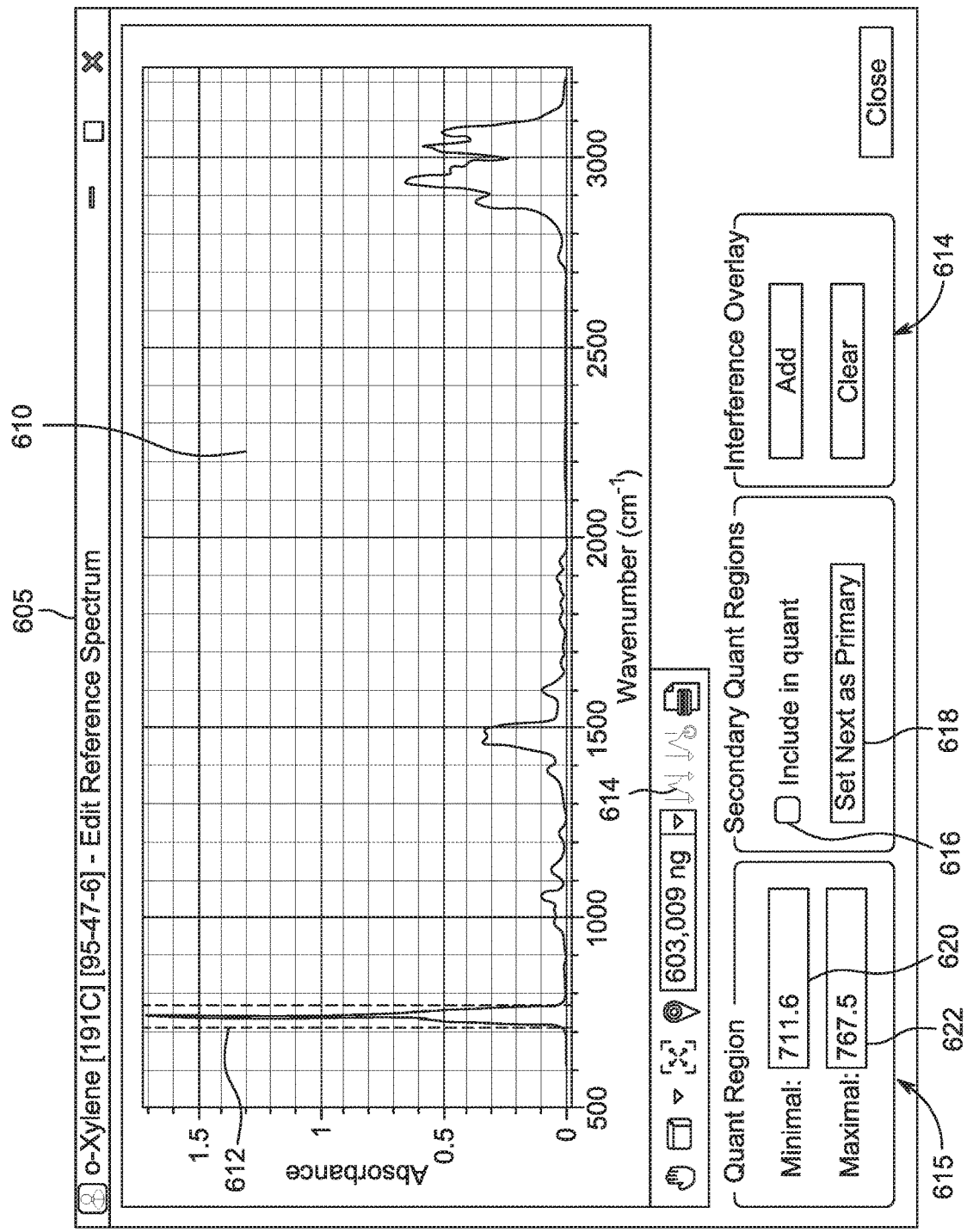
FIG. 13 shows the user interface generated by a computer system such as the controller to enable user definition of quant regions for each of the reference spectra.

FIG. 13 shows a window 605 of the user interface 16 generated by the controller 11 or other computer system and displayed on display device 15, for example, to enable user definition of quant regions for each of the reference spectra and selection of which quant regions to apply when analyzing a sample spectra.

In general, the quant region definition window 605 includes a plot region 610 in which a reference spectrum is shown as an absorbance versus wavenumber plot.

User selection of the quant region definition button 614 causes the display of the quant region boundary lines 612 in the plot region 610. The user can them adjust each of the boundary lines 612 individually using a mouse or touchpad or other user input device. For the quant region, the location of the minimal boundary line and the maximal boundary lines are indicated by wavenumber in minimal text box 620 and the maximal text box 622 in the quant region box 615. The numbers update as the users moves the quant region boundary lines 612, or the user can directly type in the desired wavenumber quantities in the text box for the minimal boundary line 620 and the text box for maximal boundary line 622. The location of the boundary lines 612 will be updated in the plot region 610 as a consequence.

It should be noted that the analytical process executing on the controller 11 allows quant regions to be edited directly in those programs, rather than a separate standalone application.

The quant region definition window 605 also allows the user to select quantification with all quant regions or only the primary. Specifically by checking box 616, the user specifies that the secondary quant regions should be used to analyze the sample spectrum. This box 616 is left unchecked when the user desires to only use the primary quant region.

The user may also switch which quant region is considered primary using the "Set Next as Primary" button 618. By turning off include secondary in quant and using the set next as primary, users can quickly alternate between different quant regions.

FIGS. 14A-14F show a quant matrix plotting tool window 710 of the user interface 16 generated by the controller 11 or other computer system.

Figure 14A:
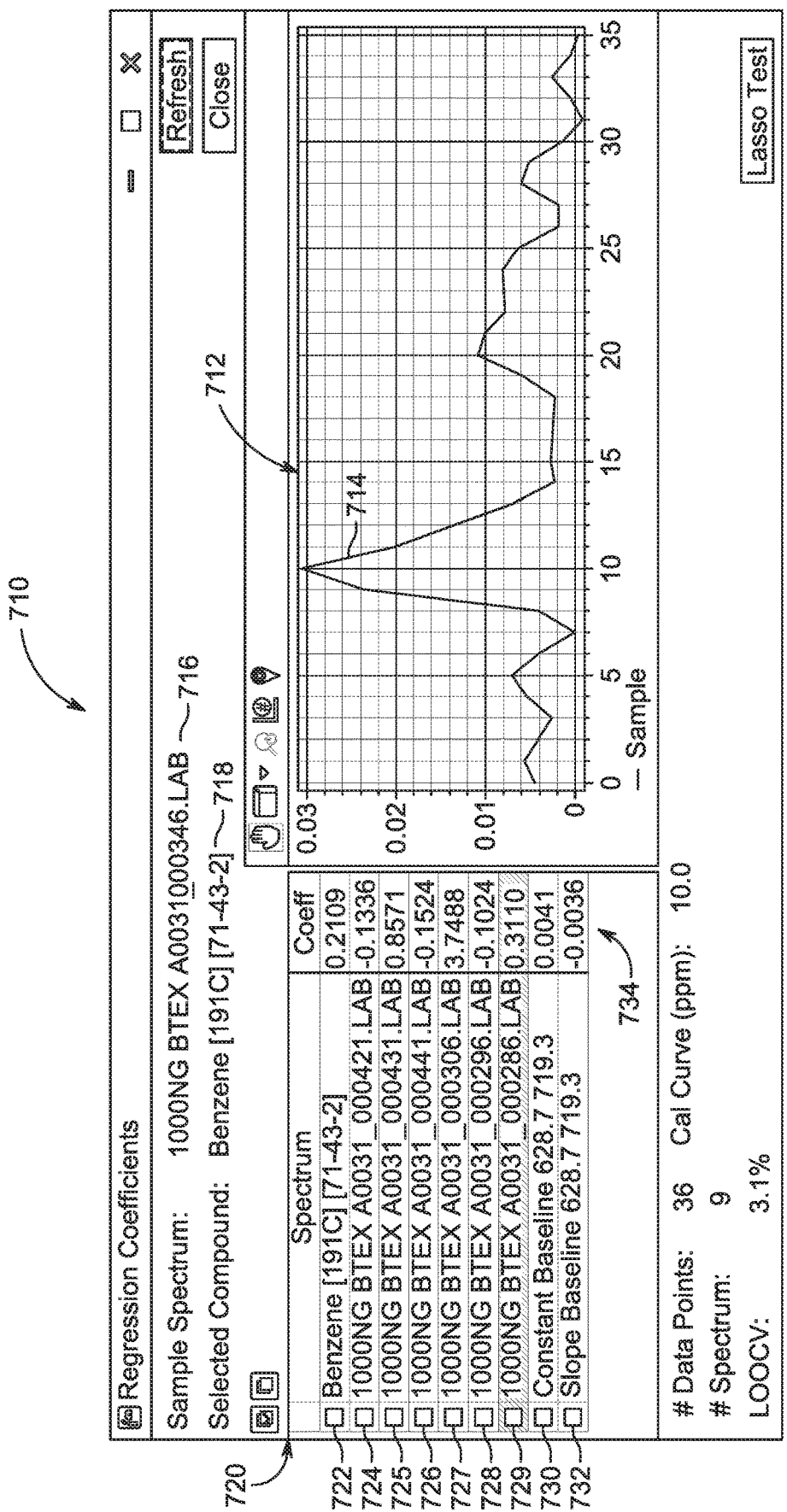
FIGS. 14A-14F show a user interface of a quant matrix plotting tool generated by the controller.

FIG. 14A shows the quant matrix plotting tool window 710. It includes a spectral plot portion 712. In the spectral plot, the sample absorbance spectrum 714 is shown. Note, in the illustrated example, arbitrary units are shown for the absorbance and wave-number axes.

Line 716 shows the particular file holding the sample spectrum 714. Line 718 shows the reference spectrum for the compound of interest, here benzene.

Subwindow 720 lists the various files that are accessed by the quant matrix plotting tool. Listed is file 722 containing the reference spectrum for benzene.

Also listed are the files 724, 725, 726, 727, 728, and 729 that contain the sample spectra that are going to be used as reference spectra for background removal. As described earlier, these sample spectra for the background removal were collected typically both before and after benzene eluted.

Also included is a constant baseline file 730 and a slope baseline file 732. These are used for baseline adjustment.

Each of the files has an associated coefficient listed in column 734. These coefficients represent how much to scale to corresponding spectrum. These coefficients or scaling factors are produced by the regression discussed with reference to FIG. 2. The corresponding spectrum is multiplied by its coefficient and the scaled spectra are summed together to produce the closest fit (in least squares sense) to the sample spectrum 714.

Figure 14B:
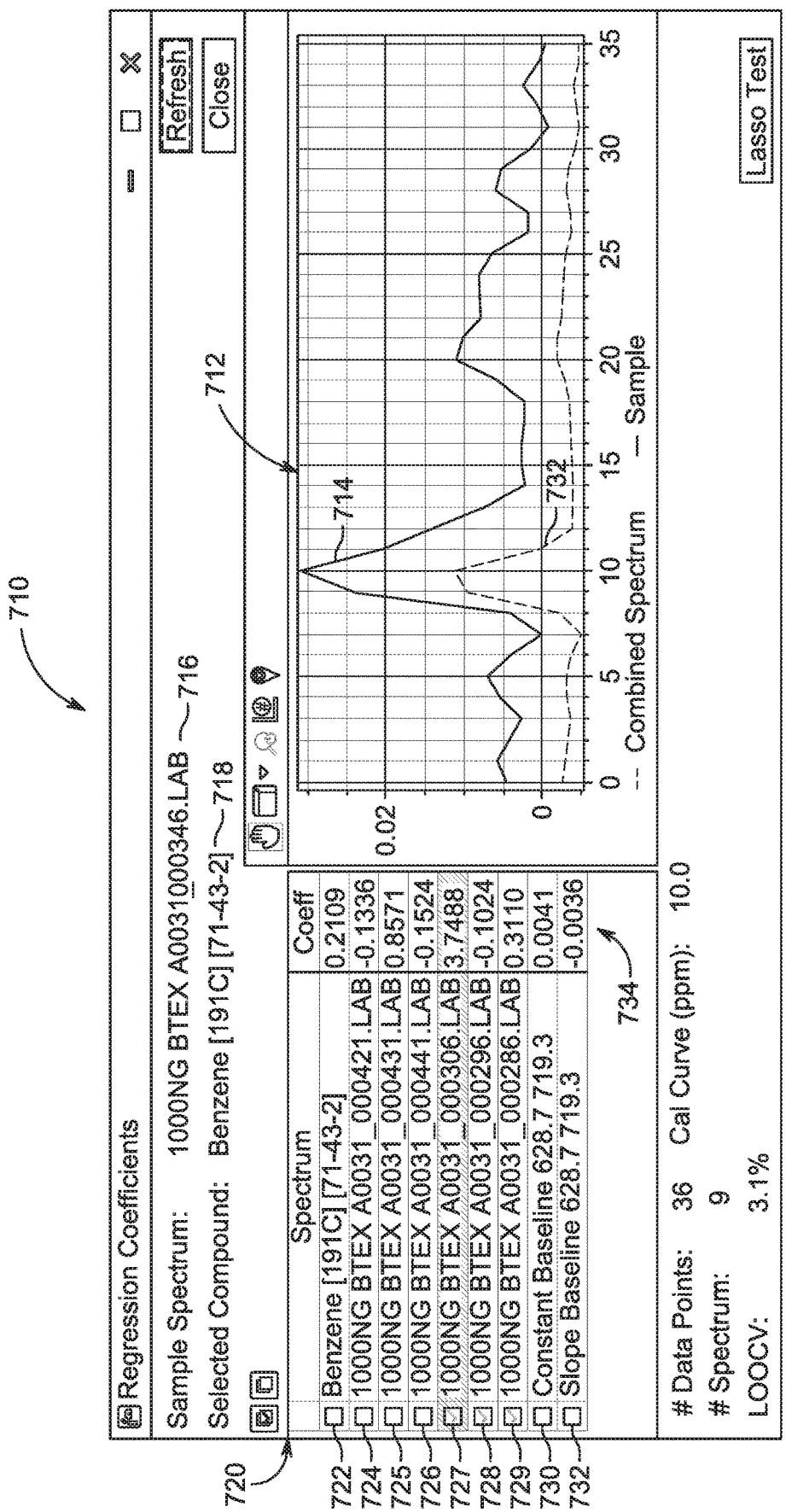

As shown in FIG. 14B, when the user checks the box associated with a particular file, then the corresponding one or more spectra are summed together, using their corresponding coefficients to produce a net spectrum 732. This net spectrum 732 is plotted in the spectral plot portion 712. This shows how well the selected spectra will sum to the sample spectra 712.

Figure 14C:
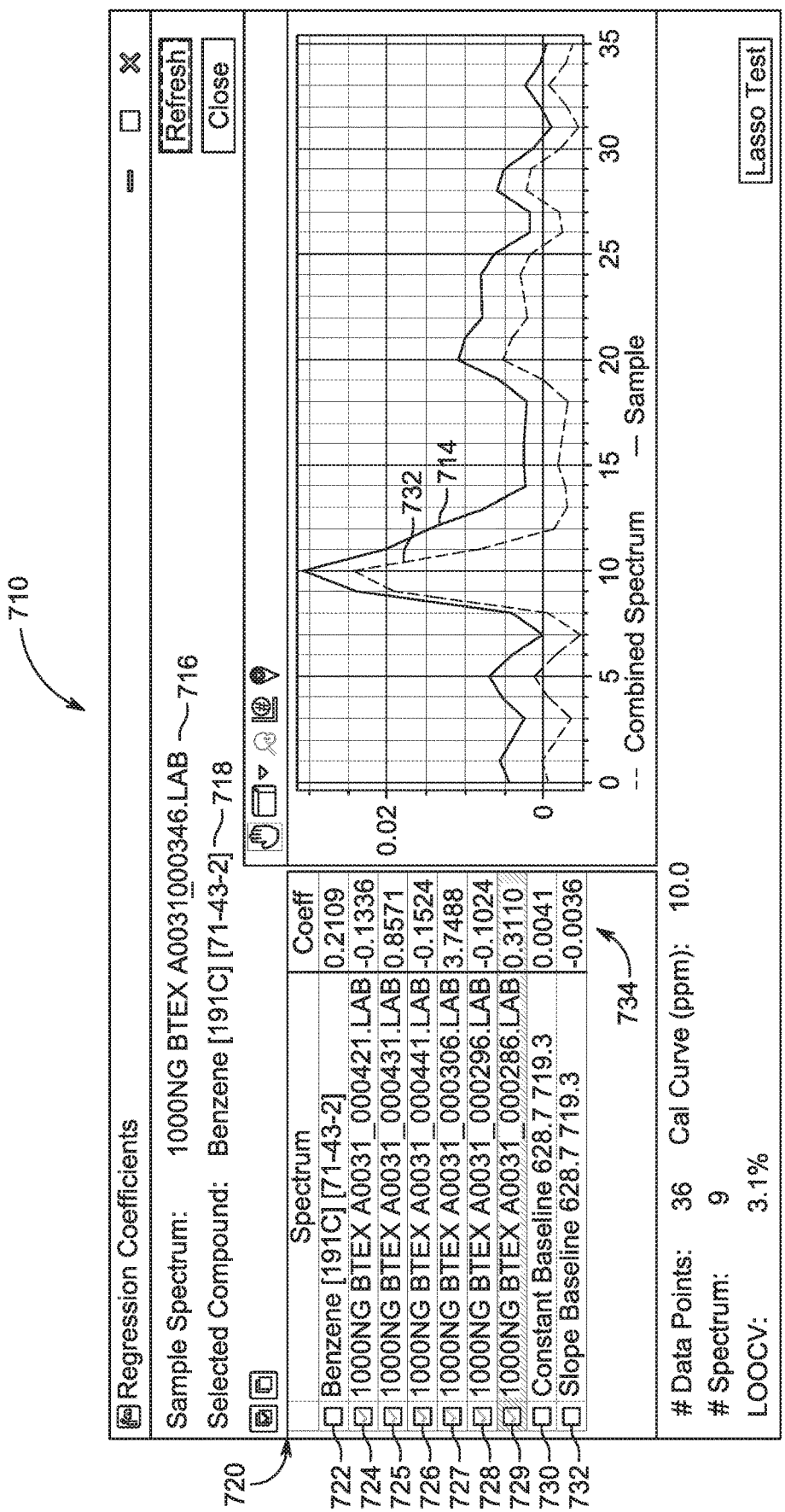

FIG. 14C shows the result when the user selects all of the reference spectra 724, 725, 726, 727, 728, and 729. Now the net spectra 732 better matches the sample spectra 712.

Figure 14D:
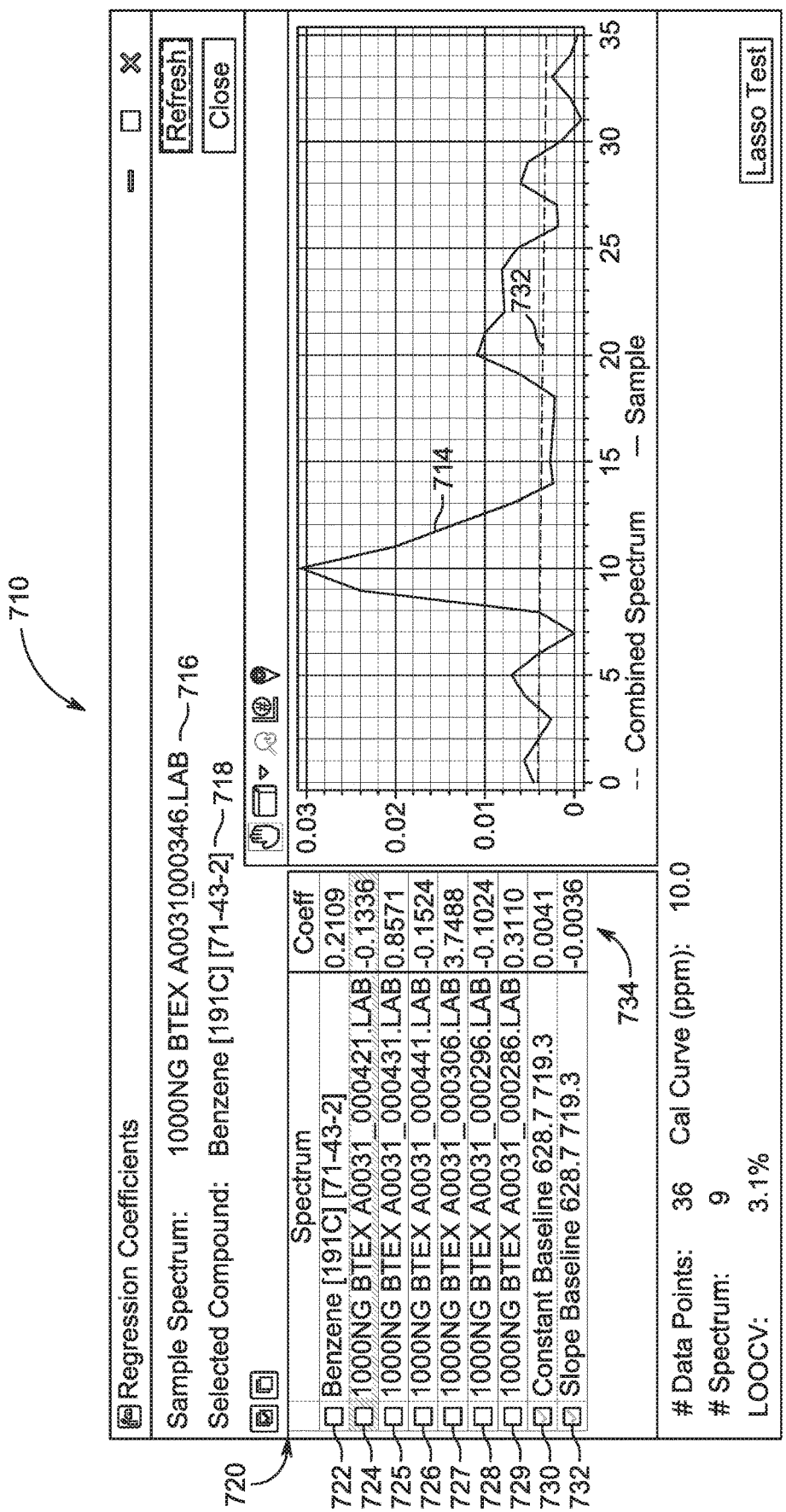

FIG. 14D shows the result when the user selects the constant baseline spectrum 730 and the slope baseline spectrum 732.

Figure 14E:
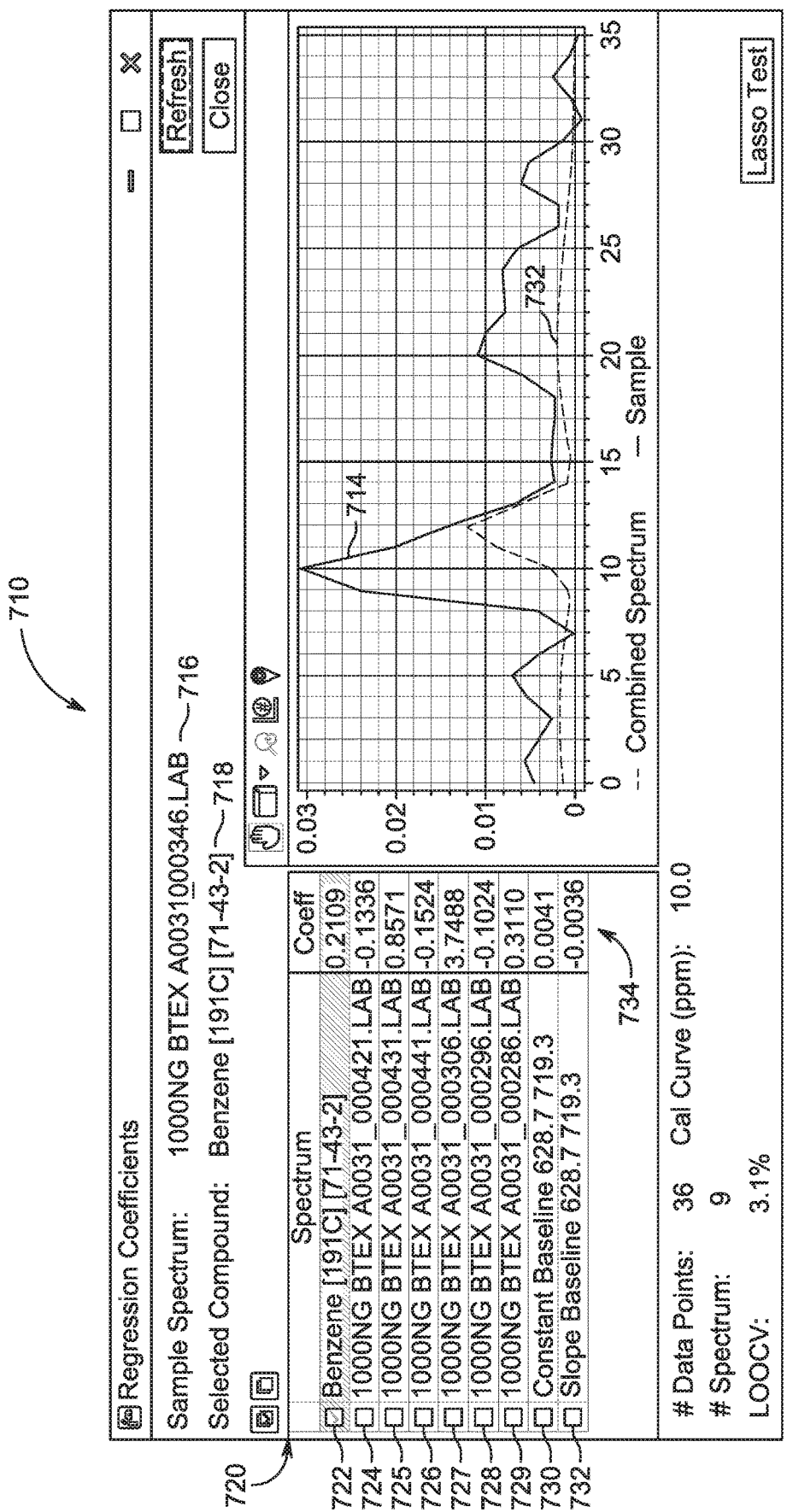

FIG. 14E shows the result when the user selects the reference spectrum 722 for benzene. Then, the net spectra 732 is the reference spectrum for benzene.

Figure 14F:
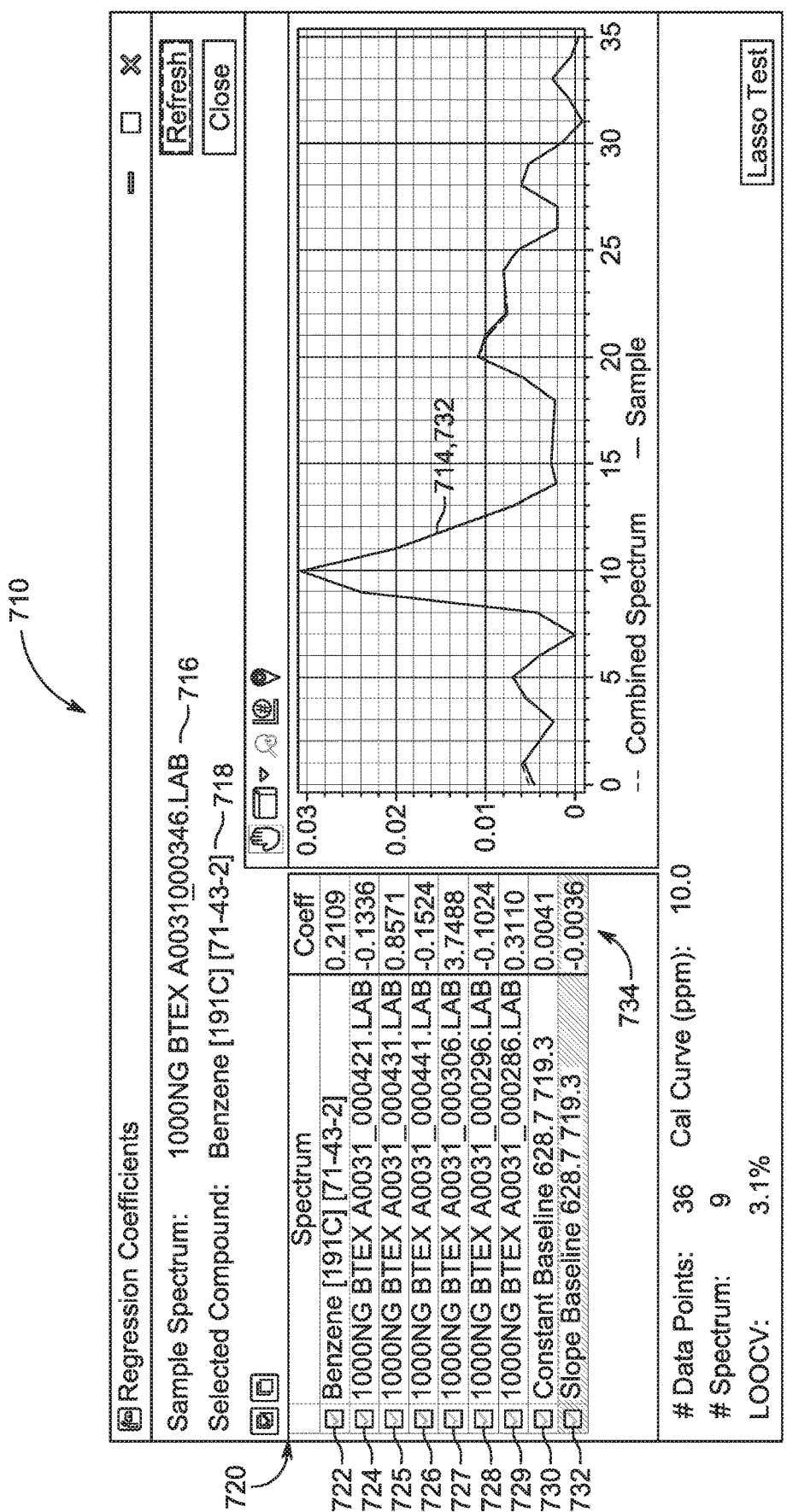

FIG. 14F shows the result when the user selects both the reference spectrum for benzene 720 and the sample spectra that are used for background correction 724-729, along with the constant baseline spectrum 730 and the slope baseline spectrum 732.

Now there is exact match between the net spectrum 732 and the sample spectrum 712 suggesting that the coefficient for benzene is an accurate estimate for the quantity of benzene in the sample.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for analyzing sample spectra of a sample from a spectrometric system, the method comprising:
    obtaining the sample infrared spectra of compounds eluting from a separator with the spectrometric system that gathers the sample infrared spectra by flowing the compounds into a gas cell;
    shifting entire retention windows to find a rough approximation of the retention windows and then separately shifting lower bounds of the retention windows and shifting upper bounds to fine tune the retention windows;
    comparing the sample infrared spectra from the shifted retention windows to optical reference spectra for compounds of interest in the sample by regressing the optical reference spectra over the sample infrared spectra of the shifted retention windows and rating fit; and
    updating the retention windows used to analyze the sample with the shifted retention windows with the best fit.

2. The method of claim 1, further comprising validating the shifted retention windows.

3. The method of claim 2, wherein validating the shifted retention windows comprises:
    calculating retention times for compounds based on the shifted retention windows;
    comparing the calculated retention times against expected retention times for the compounds; and
    analyzing differences between the calculated retention times against expected retention times for different compounds to validate the shifted retention windows.

4. The method of claim 2, wherein validating the shifted retention windows comprises:
    calculating retention times for compounds based on the shifted retention windows;
    comparing the calculated retention times against expected retention times for the compounds; and
    analyzing differences between the calculated retention times against expected retention times for different compounds to highlight outlier calculated retention windows.

5. The method of claim 1, wherein the sample spectra are gathered by a Fourier transform infrared spectrometry (FTIR) system.

6. The method of claim 1, wherein shifting the retention windows includes moving the retention windows to several different locations in time around a baseline window location.

7. The method of claim 6, wherein comparing the sample spectra comprises calculating regressions using a reference optical spectrum for a compound of interest against the sample spectra while performing background removal.

8. The method of claim 7, wherein fit of the reference optical spectrum is rated based on a fit between the reference optical spectrum and the sample spectra for the different locations around the baseline window location.

9. The method of claim 8, further comprising penalizing the fit for each window if a concentration of the compound of interest has a negative concentration.

10. The method of claim 1, wherein comparing the sample spectra comprises regressing the reference spectra over a quant spectrum selected from the sample spectra from the shifted retention windows and rating fit.

11. The method of claim 1, wherein sample spectra from the updated retention windows are used in a background removal process.

\* \* \* \* \*